United States Patent [19]
Ichikawa et al.

[11] Patent Number: 5,982,490
[45] Date of Patent: Nov. 9, 1999

[54] APPARATUS AND METHOD FOR WAVEFRONT ABSOLUTE CALIBRATION AND METHOD OF SYNTHESIZING WAVEFRONTS

[75] Inventors: Hajime Ichikawa; Takahiro Yamamoto, both of Yokohama, Japan

[73] Assignee: Nikon Corporation, Tokyo, Japan

[21] Appl. No.: 09/018,529

[22] Filed: Feb. 4, 1998

[30] Foreign Application Priority Data

Feb. 4, 1997 [JP] Japan ..................................... 9-021105
Apr. 4, 1997 [JP] Japan ..................................... 9-086733

[51] Int. Cl.$^6$ ..................................................... G01B 9/02
[52] U.S. Cl. ........................... 356/359; 356/360; 356/351
[58] Field of Search ..................................... 356/351, 359, 356/360

[56] References Cited

FOREIGN PATENT DOCUMENTS

| | | |
|---|---|---|
| 62-127601 | 6/1987 | Japan . |
| 5-40024 | 2/1993 | Japan . |
| 7-043125 | 2/1995 | Japan . |
| 8-233522 | 9/1996 | Japan . |

OTHER PUBLICATIONS

Grzanna et al, "Absolute Testing of Flatness Standards at Square–Grid Points", Optics Communications, pp. 107–112, Jun. 1990.

E.A. Lord, et al., "The Mathmatical Description of Shape and Form", published 1984 by Ellis Horwood Limited, p. 202.

*Primary Examiner*—Robert H. Kim
*Attorney, Agent, or Firm*—Morgan, Lewis & Bockius LLP

[57] ABSTRACT

A method is provided for deriving an absolute surface profile of an object having a rotationally symmetric component and a rotationally asymmetric component using a detection system for measuring a relative surface profile of the object with respect to a predetermined reference surface. The method includes the steps of positioning the object to a first predetermined position relative to the detection system, rotating the object around a predetermined measurement axis of rotation at the first predetermined position, acquiring data indicating the relative surface profile of the object with respect to the predetermined reference surface at each of a plurality of rotational positions of the object during the rotating step, averaging the data acquired in the acquiring step over the plurality of rotational positions to derive a rotationally averaged data, and processing the rotationally averaged data and the data indicating the relative surface profile of the object at at least one of the plurality of rotational positions of the object to derive the rotationally asymmetric component of the absolute surface profile of the object. The method further includes the steps of translating the object to a second predetermined position relative to the detection system, acquiring data indicating the relative surface profile of the object at the second predetermined position, and processing the data indicating the relative surface profile of the object at the second predetermined position and at least one of the rotationally averaged data and the data indicating the relative surface profile at at least one of the plurality of rotational positions of the object to derive the rotationally symmetric component of the absolute surface profile of the object, the data processing using a polynomial best fitting method for the data indicating the relative surface profile at the second predetermined position.

11 Claims, 15 Drawing Sheets

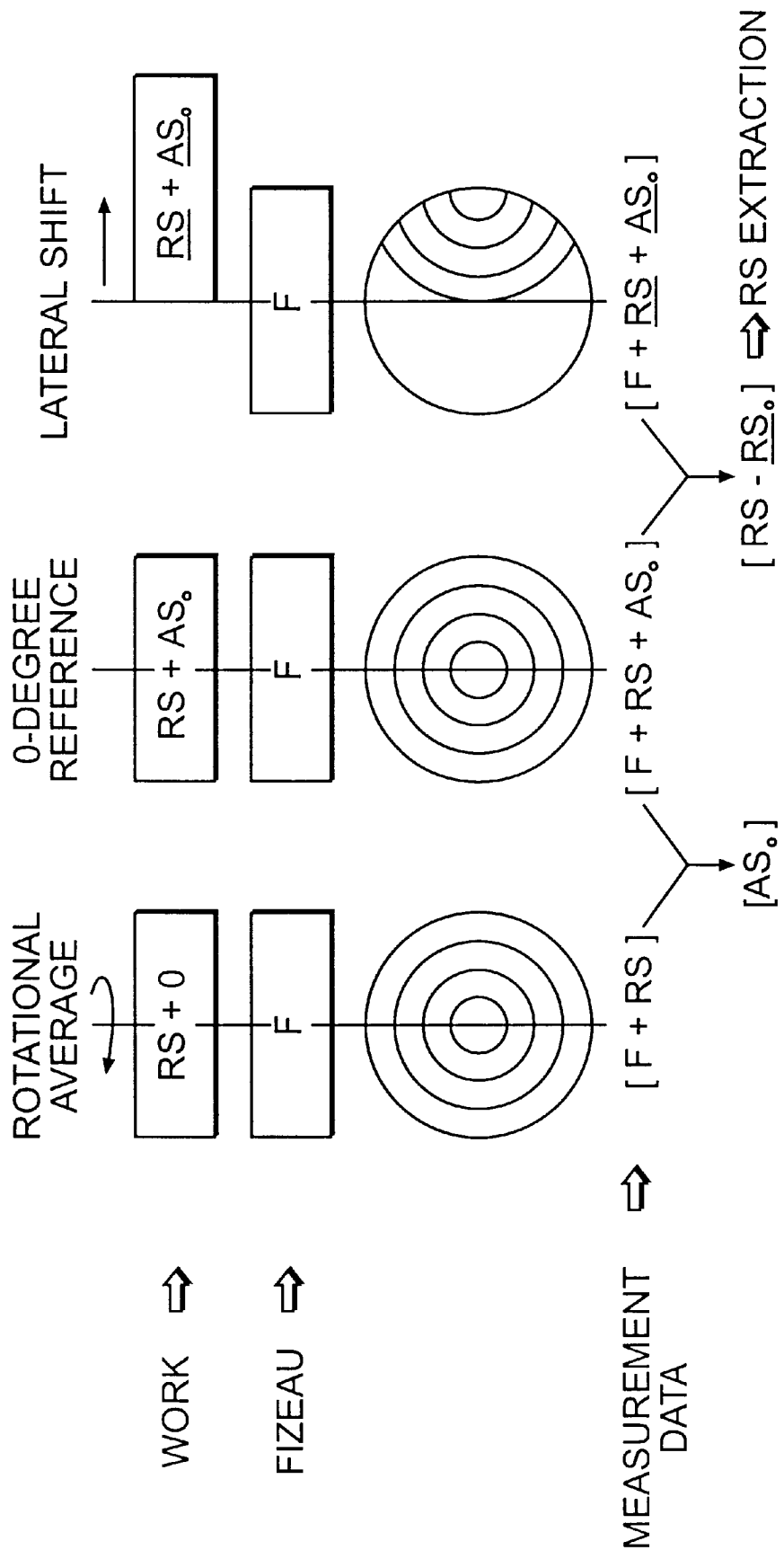

NUMBER OF PIXELS =
= 386.
rms VALUE = 0.00173427

NYMBER OF PIXELS =
= 420
rms VALUE = 0.00156417

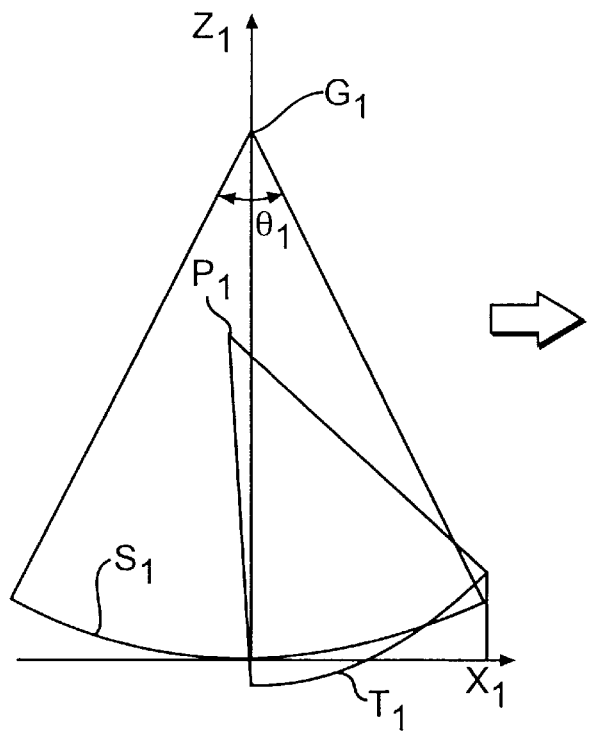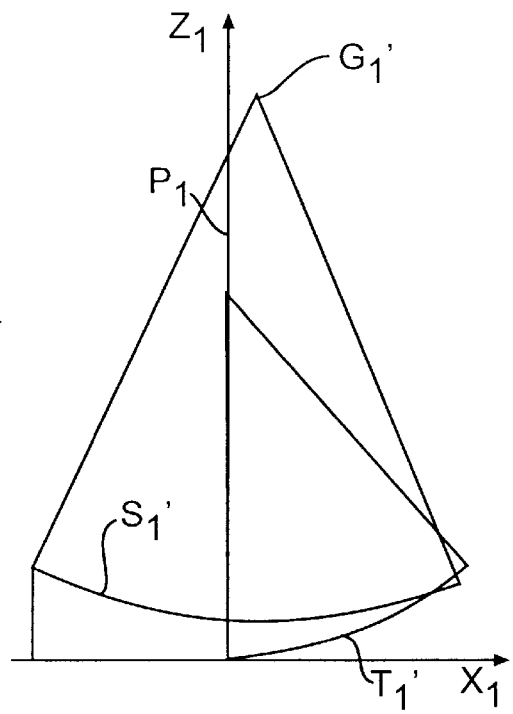
FIG. 7A  FIG. 7C
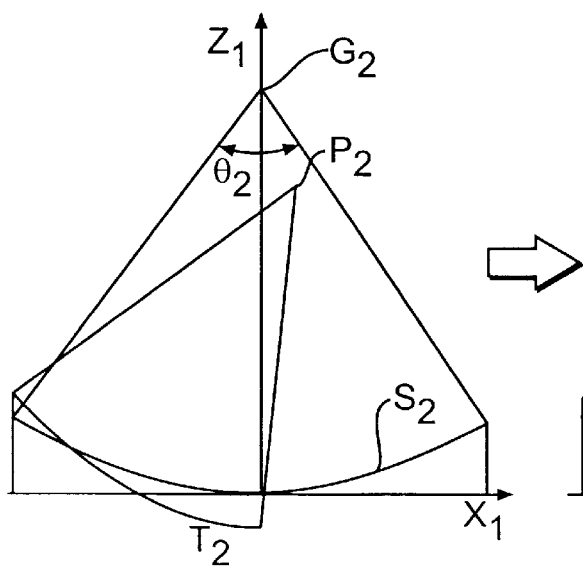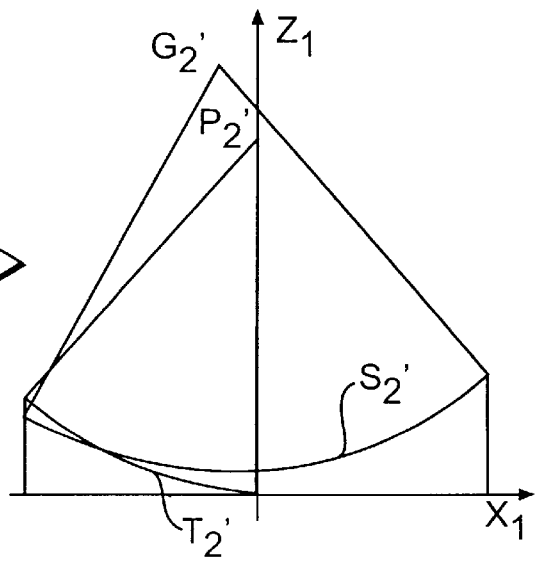
FIG. 7B  FIG. 7D

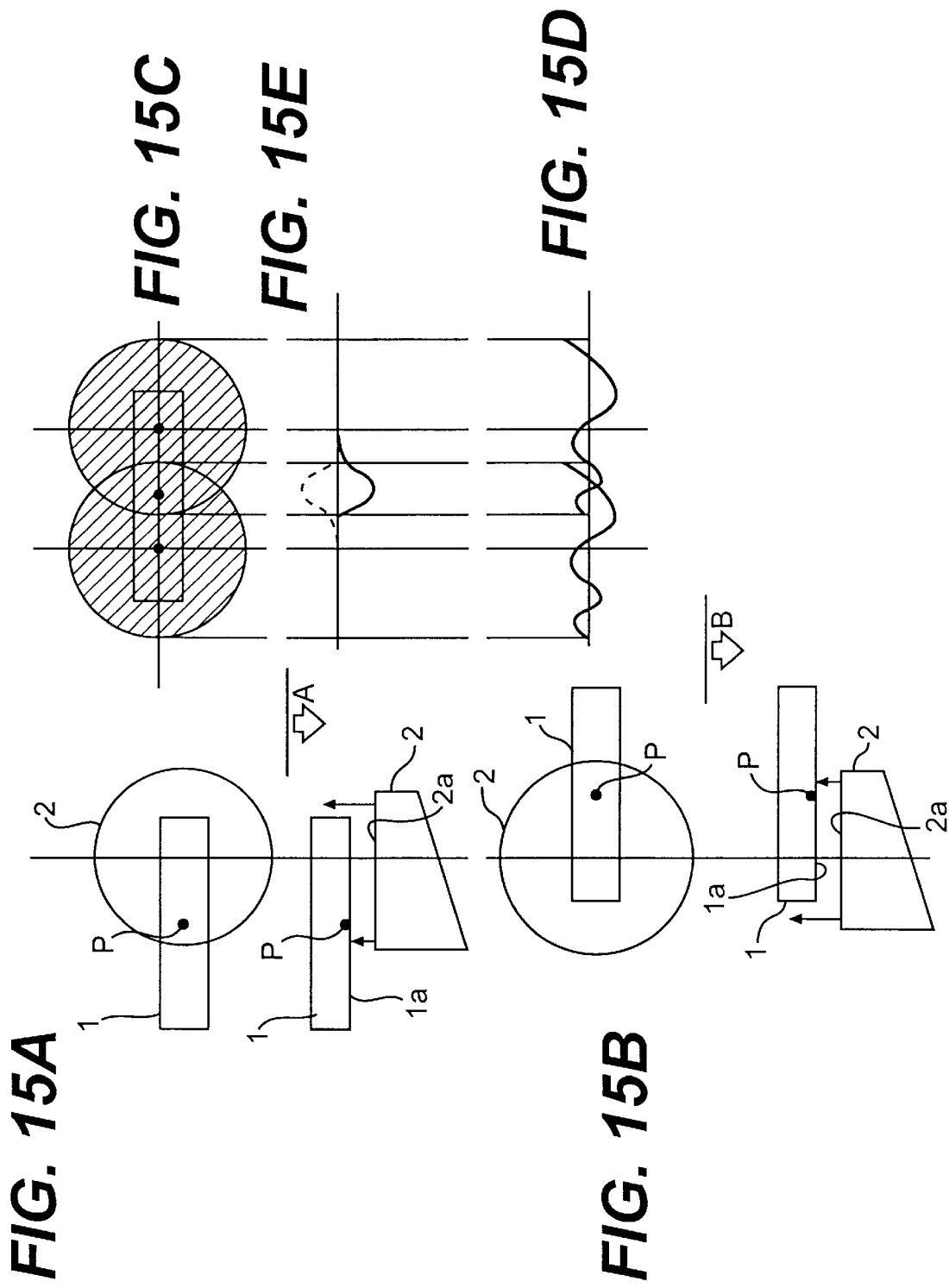

APPARATUS AND METHOD FOR WAVEFRONT ABSOLUTE CALIBRATION AND METHOD OF SYNTHESIZING WAVEFRONTS

This application claims the benefit of Japanese Application No. 09-086733 filed Apr. 4, 1997 and Japanese Application No. 09-021105 filed Feb. 4, 1997, which are hereby incorporated by reference.

BACKGROUND OF THE INVENTION

1. Field of the Invention

The present invention relates to a method for performing absolute calibration measurement of wavefronts and an absolute calibration apparatus used for interferometric measurement of precision surfaces such as planes and spheres and a method of synthesizing wavefronts used for measurement of large diameter planar, spherical, or aspheric surfaces.

2. Discussion of the Related Art

A wavefront generation extraction computation method is described in Japanese Patent Laid-open Publication H7-043125, which is hereby incorporated by reference, that focuses primarily on algorithms for extracting rotationally symmetric components. In particular, the chief objective of the method is the removal of the effects of environmental disturbances by applying the rotationally symmetric component of the data, which is essentially contour in nature, to all of the lateral shift subtraction data.

In the wavefront generation extraction computation method, however, there is a problem in that if there is too much aberration in the reference wavefront, the best approximation sphere (plane) of the reference standard surface becomes severely tilted, inevitably introducing rotationally symmetric component extraction errors.

A conventional wavefront synthesis method makes partial measurements, joining the data piece by piece. This joining process creates areas in which large-diameter spherical surfaces overlap with each other. To collect data in this manner for an entire sphere, the method relies on the fact that overlap areas in the data from the partial measurements are essentially equal. A conventional apparatus for this wavefront synthesis method is disclosed in Japanese Patent Laid-Open Publication No. 5-40024, which is hereby incorporated by reference.

The synthesizing wavefronts method performs operations in which multiple sets of different interferometric measurement data are joined together. Normally, best-fit curve-fitting (of which the least squares method is a representative type) is performed to compensate for variances contained in the sets of measurement data.

If there are shape errors in the reference surface (in a Fizeau interferometer, the Fizeau surface) or there are lateral coordinate errors, since these errors tend to skew the data, the above assumption that the shapes of the overlap areas are essentially equal no longer holds true. Therefore, the partial measurement data does not fit together well, even when statistical techniques such as best-fit curve fitting are used. This point is considered further below.

FIG. 15 illustrates interferometric measurement of a test surface (a plane). The interferometer used here is a Fizeau interferometer, but the type of interferometer is not important. Since the wavefront synthesis can work if there are at least two sets of partial measurement data, the explanation assumes two sets of data.

We will use a planar surface as the test surface to simplify the explanation. When the test surface is a spherical or aspheric surface, there is an increase in error factors associated with "alignment error corrections" (computations to correct for apparent errors that occur due to alignment factors that always exist in interferometers).

As shown in FIG. 15A wavefronts from the test surface $1a$ of a test object 1 and the Fizeau surface $2a$ of the Fizeau flat 2 are caused to interfere. Then by applying an alignment error correction (tilt, for a planar surface) to the resulting interference pattern obtained, shape error (flatness) data is obtained for the test surface $1a$, with Fizeau surface $2a$ as the reference surface (the surface that serves as the standard against which the shape error of the test surface is judged). We will designate this data as the "first partial measurement data."

The test surface $1a$ is then shifted laterally, as shown in FIG. 15B, and another interferometer measurement is performed in the same manner. The data from this measurement is designated the "second partial measurement data." In FIG. 15B, a marking, "P," is placed on the test area 1 to make it easier to visualize its lateral movement state.

FIG. 15C shows the two sets of partial measurement data joined, with this marking "P" as the reference. Moreover, in actual measurements, in order to make it possible to superimpose the two sets of partial measurement data, even when the object is rotated the test object 1 by lateral movement a minimum of two markings on the test surface $1a$, or the equivalent thereof in measurement control, are required. Additionally, if there is a change in the magnification factor of the data for each partial measurement (the equivalent of zooming on the data) a minimum of two markings on the test surface $1a$, or the equivalent thereof in measurement control, are required.

It is a common practice, in high-precision interferometric measurements, to perform "reference subtraction." This is done to avoid the labor-intensive effort required to obtain a high-precision finish on the Fizeau surface and to avoid the influence of drift during measurement. Reference subtraction is a procedure that is performed just prior to taking the measurements on the test surface to calibrate the measurement wavefront incident to the test surface (hereinafter, the "reference wavefront") against a reference standard surface of even higher surface precision, by establishing interference between wavefronts of the Fizeau surface and the reference standard surface. When this "reference subtraction" is used, the function of the reference surface for the measurement is transferred from the Fizeau surface to the reference standard surface.

Because the reference standard surface is normally finished to a high level of precision, for the precision required for measurement of normal surfaces under test when data is not being joined, the absolute shape error of the reference standard surface itself can be ignored. When performing interferometric measurement of surfaces by the wavefront synthesis method, however, the overlap areas of the two sets of partial measurement data correspond to two different areas of the reference surface. In FIG. 15C, the reference surfaces, when the partial measurement data in FIG. 15A and FIG. 15B were obtained, are indicated by shading, with the shaded overlapping portion indicating the overlap of the partial measurement data.

As can be seen in FIG. 15D, the shape error of the Fizeau surface (reference standard surface) is not offset in the overlap area. Thus, even if a reference subtraction technique is used, the shape error of the reference standard itself will inevitably end up being superimposed on the interferometer data. Therefore, while the magnitude of the error may depend on the size of the overlap area and the precision of the reference standard surface, in this method, a certain amount of data-joining errors in best-fit curve fitting was unavoidable.

The data-joining errors also occur when the reference surface itself has lateral coordinate distortion. In general, a wavefront passing through a light-converging optical system receives primarily rotationally symmetric distortion. For example, if the area measured by the entire Fizeau surface could be specified, it would receive a standardized lateral coordinate distortion at the effective center of the Fizeau surface and the outer diameter as is shown in FIG. 15E. In this drawing, the solid line shows, along the vertical axis, the shift of positions of FIG. 15A measurement data points (positions on the test surface corresponding to pixels of the CCD imaging device of the interferometer). The horizontal axis represents the effective area of the Fizeau surface. The dotted line shows a similar curve plotted with the origin of the coordinate system of FIG. 15B as the reference. The fact that the signs (polarity) of the curves in FIG. 15E are different indicates that the positions of the data points are shifted in the opposite direction.

Both curves are for the case in which the center axis of the rotationally symmetric distortion passes through the origin of the coordinate system. The coordinate system origin is the computation origin for alignment error correction and can be taken as the center of the effective area of the Fizeau surface.

As shown in FIG. 15E, the sampling points in the two partial measurement areas of the test surface do not match, even if partial measurement data that has been corrected for reference surface shape error is used, for example, this will not offset the shape of the test surface. In addition, when the test surface is not a plane, there will be "geometric distortion" due to the different coordinate systems.

SUMMARY OF THE INVENTION

Accordingly, the present invention is directed to an apparatus and method for wavefront absolute calibration and a method of synthesizing wavefronts that substantially obviates one or more of the problems due to limitations and disadvantages of the related art.

It is an object of the present invention to provide an absolute calibration method and absolute calibration apparatus that will make it possible to calibrate measurement wavefronts used to perform interferometric measurement of the shape of a test surface.

A further object of the present invention to provide a waveform synthesis method capable of ensuring consistency of data in waveform synthesis overlap areas.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides a method of deriving an absolute surface profile of an object having a rotationally symmetric component and a rotationally asymmetric component using a detection system for measuring a relative surface profile of the object with respect to a predetermined reference surface, the method including the steps of positioning the object to a first predetermined position relative to the detection system; rotating the object around a predetermined measurement axis of rotation at the first predetermined position; acquiring data indicating the relative surface profile of the object with respect to the predetermined reference surface at each of a plurality of rotational positions of the object during the rotating step; averaging the data acquired in the acquiring step over the plurality of rotational positions to derive a rotationally averaged data; processing the rotationally averaged data and the data indicating the relative surface profile of the object at at least one of the plurality of rotational positions of the object to derive the rotationally asymmetric component of the absolute surface profile of the object; translating the object to a second predetermined position relative to the detection system; acquiring data indicating the relative surface profile of the object at the second predetermined position; and processing the data indicating the relative surface profile of the object at the second predetermined position and at least one of the rotationally averaged data and the data indicating the relative surface profile at at least one of the plurality of rotational positions of the object to derive the rotationally symmetric component of the absolute surface profile of the object, the data processing using a polynomial best fitting method for the data indicating the relative surface profile at the second predetermined position.

In another aspect, the present invention provides an interferometric measurement apparatus for deriving an absolute surface profile of an object having a rotationally symmetric component and a rotationally asymmetric component, the apparatus including a reference surface; an interferometric optical detection system for outputting data representing a relative surface profile of the object relative to the reference surface; a rotation mechanism for rotating the object; a translation mechanism for translationally moving the object; and a processor communicating with the interferometric optical detection system for processing the data outputted form the interferometric optical system, wherein the processor acquires data from the interferometric optical detection system indicating the relative surface profile of the object with respect to the predetermined reference surface at each of a plurality of rotational positions of the object while the object is rotated around a predetermined measurement axis of rotation, the processor averaging the data acquired in the measuring step over the plurality of rotational positions to derive rotationally averaged data, the processor further processing the rotationally averaged data and the data indicating the relative surface profile of the object at at least one of the plurality of rotational positions of the object to derive the rotationally asymmetric component of the absolute surface profile of the object, and wherein the processor acquires data indicating the relative surface profile of the object at a predetermined position translationally moved from one of the plurality of rotational positions relative to the interferometric optical detection system, the processor processing the data indicating the surface profile of the object at the predetermined position and at least one of the rotationally averaged data and the data indicating the relative surface profile at at least one of the plurality of rotational positions of the object to derive the rotationally symmetric component of the absolute surface profile of the object, the data processor using a polynomial best fitting method for the data indicating the relative surface profile at the predetermined position.

In another aspect, the present invention provides a method for constructing a surface profile of an object using an interferometric detector having a predetermined measurement field of view smaller than a surface of the object to be determined, the method including the steps of positioning the object to a first predetermined position relative to the interferometric detector so that the predetermined measurement field of view defines a first surface area on the object; acquiring, through the interferometric detector, first data indicating a relative surface profile of the object with respect to a reference surface in the first surface area on the object; positioning the object to a second predetermined position relative to the interferometric detector so that the predetermined measurement field of view defines a second surface area of the object, the second surface area overlapping the first surface area to define an overlapping area; acquiring, through the interferometric detector, second data indicating a relative surface profile of the object with respect to the reference surface in the second surface area on the object; removing errors due to insufficient accuracy in a surface profile of the reference surface from the first data and the second data to derive calibrated first data and calibrated second data, respectively; processing a partial set of the calibrated first data that corresponds to the overlapping area to derive a first fitting curve approximating the calibrated first data within the overlapping area; processing a partial set of the calibrated second data that corresponds to the overlapping area to derive a second fitting curve approximating the calibrated second data within the overlapping area; deriving a coordinate transformation to be applied to the second fitting curve for smoothly matching the second fitting curve with the first fitting curve in the overlapping area; applying the coordinate transformation to the calibrated second data to derive a transformed second data; combining the transformed second data with the calibrated first data to form a combined set of data corresponding to a surface region of the object covered by the first and second surface areas, and processing the combined set of data to derive the surface profile of the object for the surface region of the object covered by the first and second surface areas.

In another aspect, the present invention provides a wavefront absolute calibration method for separating surface accuracy errors of a reference surface and surface accuracy errors of a test surface from interferometric measurement data indicating a relative surface profile of the test surface with respect to the reference surface, the wavefront absolute calibration method including the steps of extracting a rotationally asymmetric component error of the test surface, including generating a rotationally symmetric wavefront having only a rotationally symmetric component of the surface accuracy errors by averaging a plurality of interferometric measurement data that are measured at a plurality of rotational positions of the test surface while the test surface is rotated about a measurement optical axis; and subtracting rotationally averaged data representing the rotationally symmetric wavefront from the interferometric measurement data measured at one of the plurality of rotational positions of the test surface to extract data representing the rotationally asymmetric component error; extracting a rotationally symmetric component error of the test surface, including measuring the interferometric measurement data at a shifted position of the test surface laterally shifted from the one of the plurality of rotational positions; subtracting one of the rotationally averaged data and the interferometric measurement data measured at the one of the plurality of rotational positions from the interferometric measurement data measured at the shifted position of the test surface to derive subtracted data; calculating lateral shift data corresponding to changes in the data representing the rotationally asymmetric component error due to the lateral translation of the test surface; and processing the lateral shift data, the subtracted data, and the data representing the rotationally asymmetric component error extracted in the step of extracting to derive data representing the rotationally symmetric component error of the test surface; and adding the rotationally symmetric component error and the rotationally asymmetric component error to derive an absolute accuracy error of the test surface, wherein the step of extracting the rotationally symmetric component error includes performing best curve-fitting for lateral shift data representing the rotationally symmetric component error measured at the shifted position using a polynomial to extract the rotationally symmetric component error.

In another aspect, the present invention provides a wavefront absolute calibration method for separating surface accuracy errors of a reference surface and surface accuracy errors of a test surface from interferometric measurement data indicating a relative surface profile of the test surface with respect to the reference surface, the wavefront absolute calibration method including the steps of extracting a rotationally asymmetric component error of the test surface, including generating a rotationally symmetric wavefront having only a rotationally symmetric component of the surface accuracy errors by averaging a plurality of interferometric measurement data that are measured at a plurality of rotational positions of the test surface while the test surface is rotated about a measurement optical axis; and subtracting rotationally averaged data representing the rotationally symmetric wavefront from the interferometric measurement data measured at one of the plurality of rotational positions of the test surface to extract data representing the rotationally asymmetric component error; extracting a rotationally symmetric component error of the test surface, including measuring the interferometric measurement data at a shifted position of the test surface laterally shifted from the one of the plurality of rotational positions; subtracting one of the rotationally averaged data and the interferometric measurement data measured at the one of the plurality of rotational positions from the interferometric measurement data measured at the shifted position of the test surface to derive subtracted data; calculating lateral shift data corresponding to changes in the data representing the rotationally asymmetric component error due to the lateral translation of the test surface; and processing the lateral shift data, the subtracted data, and the data representing the rotationally asymmetric component error extracted in the step of extracting to derive data representing the rotationally symmetric component error of the test surface; and adding the rotationally symmetric component error and the rotationally asymmetric component error to derive an absolute accuracy error of the test surface, wherein corrections to toroidal variations are preformed using a difference between the interferometric measurement data measured at symmetrical positions around the measurement optical axis among the plurality of rotational positions of the test surface.

In another aspect, the present invention provides a wavefront absolute calibration apparatus for separating surface accuracy errors of a reference surface and surface accuracy errors of a test surface from interferometric measurement data indicating a relative surface profile of the test surface with respect to the reference surface, the wavefront absolute calibration apparatus including an interference optical system for obtaining interferometric measurement data of the test surface; a rotation mechanism for rotating the test surface; a lateral shift mechanism for laterally shifting the test surface; and a computation system communicating with the interference optical system for performing the steps of extracting a rotationally asymmetric component error of the test surface, including generating a rotationally symmetric wavefront having only a rotationally symmetric component of the surface accuracy errors by averaging a plurality of interferometric measurement data that are measured through the interference optical system at a plurality of rotational positions of the test surface while the test surface is rotated by the rotation mechanism about a measurement optical axis; and subtracting rotationally averaged data representing the rotationally symmetric wavefront from the interferometric measurement data measured at one of the plurality of rotational positions of the test surface to extract data representing the rotationally asymmetric component error; extracting a rotationally symmetric component error of the test surface, including measuring the interferometric measurement data at a shifted position of the test surface laterally shifted by the lateral shift mechanism from the one of the plurality of rotational positions; subtracting one of the rotationally averaged data and the interferometric measurement data measured at the one of the plurality of rotational positions from the interferometric measurement data measured at the shifted position of the test surface to derive subtracted data; calculating lateral shift data corresponding to changes in the data representing the rotationally asymmetric component error due to the lateral translation of the test surface; and processing the lateral shift data, the subtracted data, and the data representing the rotationally asymmetric component error extracted in the step of extracting to derive data representing the rotationally symmetric component error of the test surface; and adding the rotationally symmetric component error and the rotationally asymmetric component error to derive an absolute accuracy error of the test surface, wherein the step of extracting the rotationally symmetric component error includes performing best curve-fitting for lateral shift data representing the rotationally symmetric component error measured at the shifted position using a polynomial to extract the rotationally symmetric component error.

In a further aspect, the present invention provides a wavefront synthesis method for determining an overall shape of a test surface using an interferometric measurement optical system, including the steps of preforming partial interferometric measurement at each of a plurality of partial areas of the test surface using the interferometric measurement optical system to output data indicating a relative surface shape of each of the plurality of partial areas relative to an absolute surface shape of a reference surface, the plurality of partial areas having overlapping areas; eliminating lateral coordinate errors of the partial areas within the overlap areas thereof by taking into account distortion of the data indicating the relative surface shape occurring due to the interferometric measurement optical system; and joining the data indicating the relative surface shape of the partial areas to construct a set of the data representing the overall shape of the test surface.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 1A–1C illustrates the measurement principle applied in the wavefront absolute calibration method of the present invention;

FIGS. 7A–7C illustrate principles involved in shape measurement of a spherical test surface according to the present invention;

FIG. 7A shows data of a first configuration of the data;

FIG. 7B shows data in a second configuration;

FIG. 7C shows data in the first configuration after alignment error correction has been performed on the overlap area data;

FIG. 7D shows data in the second configuration of FIG. 7C after alignment error correction has been performed on the overlap area data;

FIGS. 15A–15D show a conventional wavefront synthesis method for measurement of the shape of test surface, with FIG. 15A showing a configuration for obtaining a first set of partial data, FIG. 15B showing another configuration for obtaining a second set of partial data, FIG. 15C showing the placement relationship of the test surface in the two configurations, FIG. 15D showing respective partial area data, and FIG. 15E showing lateral coordinate displacement.

DETAILED DESCRIPTION OF THE PREFERRED EMBODIMENTS

Figure 2A:
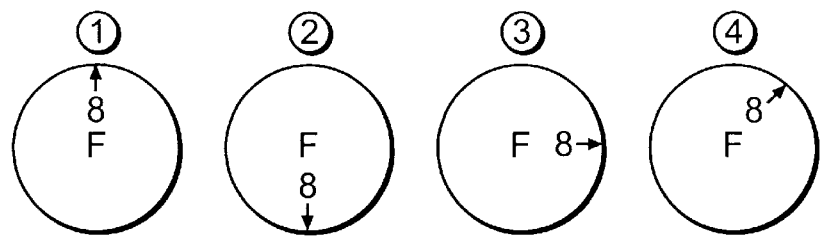
FIGS. 2A–2J illustrates a procedure for obtaining rotation averaged data and AS components.

Reference will now be made in detail to the preferred embodiments of the present invention, examples of which are illustrated in the accompanying drawings.

The measurement principle involved in the wavefront absolute calibration method of the present invention is illustrated in FIGS. 1A and 1B. Note that although the following discussion describes absolute calibration of surface precision error in an reference standard surface, the present invention is not limited to applications involving absolute calibration of reference standard surfaces: for example, it can be also used for measurement of surfaces in general, and of measurement wavefronts used for interferometry such as the measurement null wavefronts used in null interferometry.

For a wavefront generation extraction method to be free of computation errors, it is important that an alignment error correction be properly applied in the computation process.

The interference measurement shown in FIG. 1A illustrates the process of reference standard surface rotation averaging. For simplicity, it is assumed here that measurement data are being obtained for data of equal circumference divided into four equal parts. The obtained data are designated D0, D1, D2, and D3. It is imperative that alignment error corrections (corrections to determine the surface precision required for the surface being checked) be applied to this data. For the following description, it is assumed that the reference standard surface is spherical and that the parameter being measured is the surface precision error (sphericity error) of that reference standard surface.

When the measurement is made, even if an alignment error correction is applied to the measurement data, it can still be expected that the best approximation spherical surface will include an alignment error component due to errors of the Fizeau surface (the reference surface of the interferometer) or the like. If this error is defined as alignment error AGi, it can be expressed by the following equation:

$$AGi = Pi + Txi \cdot X + Tyi \cdot Y + fi[X^2 + Y^2] \qquad \text{Equation (1)}$$

Also, the four data values mentioned above can be expressed by Equation (2):

$$Di = F + RS + ASi + AGi, \qquad \text{Equation (2)}$$

where:
F is the reference wavefront (Fizeau surface) sphericity error; RS is the reference surface (reference standard surface) rotationally symmetric component error; ASi is the reference standard surface non-rotationally symmetric component error, and all alignment errors attributable to the reference wavefront (Fizeau surface) and reference standard surface are included in AGi.

These surface precision errors satisfy Equations (3) and (4):

$$ASi = AS0 \cdot Ki \qquad \text{Equation (3)}$$

$$\Sigma ASi = 0 \qquad \text{Equation (4)}$$

where AS0 is a reference value and represents the rotationally asymmetric component error in the 0-degree direction. Also, Ki is a rotation vector indicating that the reference standard surface is rotated and that the non-rotationally symmetric component is rotated at the same time. At this time, AVE is given as $$\begin{aligned} AVE &= \sum Di/n \\ &= F + RS + \sum ASi/n + \sum AGi/n \\ &= F + RS + \sum AGi/n \end{aligned} \qquad \text{Equation (5)}$$

If perfect rotation averaging is performed, using the symbols defined above, it can be seen that the following relationship will hold true:

$$\Sigma AGi = 0 \qquad \text{Equation (6)}$$

Conversely, whether sufficient rotation averaging was performed can be deferred, based on whether Equation (6) is satisfied. Assuming that perfect rotation averaging was performed, the following Equation (7) is satisfied:

$$D0 - AVE = (F + RS + AS0 + AG0) - (F + RS) = AS0 + AG0 \qquad \text{Equation (7)}$$

AG0 can be eliminated by applying an additional alignment error correction to this data; thus it is possible to extract AS0.

If the reference standard surface is shifted laterally and measured with Dy being measured data, the data Dy can be expressed by Equation (8) as follows:

$$Dy = F + (\underline{RS} + \underline{AS0}) + AGy \qquad \text{Equation (8)}$$

where the underlined terms $\underline{RS}$ and $\underline{AS0}$ are the laterally-shifted data. F is offset by subtracting the data Dy from d0 or AVE. In FIG. 1, the data is subtracted from the 0-degree reference data as shown in FIGS. 1B and 1C. To simplify the explanation, however, the 0-degree reference data will be subtracted from AVE below.

The data thus obtained is represented by Equation (9) as follows:

$$AVE - Dy = (F + RS) - \{F + (\underline{RS} + \underline{AS0}) + AGy\} = (RS - \underline{RS}) - \underline{AS0} - AGy \qquad \text{Equation (9)}$$

Equation (9) can be rearranged as follows:

$$(RS - AGy) - \underline{RS} = (AVE - Dy) + \underline{AS0} \qquad \text{Equation (10)}$$

On the right side of Equation (10), since AVE and Dy are both known, the entire right side of the equation can be treated as known data by properly processing $\underline{AS0}$ in a processor, i.e., performing lateral shift transformation as indicated by the underline. For example, during lateral shift data processing, if the reference standard surface is spherical, the process must take into account geometrical distortion due the coordinates transformation. The geometric distortion processing will be discussed later.

Finally, the quantities RS–AGy and $\underline{RS}$ in Equation (10) are separated. When so doing, in the present invention, a quantifiable polynomial fitting process is employed to eliminate computation errors. That is, the polynomial is expanded to the required order using the coefficient Ci (i=2×(n−1), where n is natural number (a non-negative integer) resulting in Equation (11) as follows:

$$RS = C00 + C02(X^2 + Y^2) + C04(X^2 + Y^2)^2 + C06(X^2 + Y^2)^4 + \ldots \qquad \text{Equation (11)}$$

and with the magnitude of the lateral shift represented by the known quantity LS Equation (12) is obtained $$(RS - AGy) - \underline{RS} = C00 + C02'(X^2 + Y^2) +$$
$$C04'(X^2 + Y^2)^2 +$$
$$C06'(X^2 + Y^2)^4 + \ldots -$$
$$C02\{(X - LS)^2 + Y^2\} -$$
$$C04\{(X - LS)^2 + Y^2\}^2 -$$
$$C06\{(X - LS)^2 + Y^2\}^4 - \ldots$$

Equation (12)

This quantity is used for "best fit" curve-fitting to the known data of the right side of Equation (10) (to which alignment error data must not have been applied). In other words, the curve fitting is performed on the data to match the value of the right side of Equation (12) to that obtained in the above lateral shift process (known data).

Here, the "prime" symbol (') in the coefficients of the polynomial indicates the effect of rotation alignment error due to the "-AGy" term of Equation (12). In addition, the underlined symbols indicate the possibility that the coordinate system could be different due to lateral shift and that it will therefore be necessary to correct this if the reference standard surface is not a plane. Although in the above example, lateral shift was assumed to be in the X-direction, only this was done only to simplify the explanation and is not to be construed as a limitation of the invention.

A principal error of this curve-fitting technique is a tilt error of the best approximation surface of the reference standard surface. This occurs when the reference standard surface is shifted laterally, causing an error in C02.

This error can be avoided as long as the tilt of the reference standard surface relative to the reference wavefront does not change during lateral shifting, a requirement that can be built into the apparatus. It is only necessary to do so, however, if the reference standard surface of the apparatus is a plane. The reason for this is that the tilt produces an error in the C02 second order coefficient only.

Conversely, in cases in which the reference standard surface is spherical, by making use of the fact that the characteristic alignment error of the RS component is zero, it is possible to achieve absolute calibration of the RS component by re-computing C00 and C02 by performing best fit curve-fitting for only second order components for the RS component obtained using these values.

First Modified Example

An example of a first variation of a wavefront absolute calibration method according to the present invention will now be described in detail. A first variation of a wavefront absolute calibration method is a computation method wherein, when the measurement wavefront is subjected to distortion, alignment error correction is performed without interpolating the interference measurement data obtained. This kind of distortion can result from factors such as optical distortion of the measurement optics or variance in the pitch of the CCD array used to capture the image of the interference pattern. This method can be also be used to eliminate surface precision errors caused by interpolation errors arising in operations other than best fit curve-fitting.

The data used to apply alignment error corrections in Equation (1) will be designated in general terms as ($X_i$, $Y_j$, and $Z_{ij}$). The various x, y-coordinate values will be assumed to have been subjected to distortion, resulting in unequal pitch (spacing), and the x, y-coordinates are accurately recognized separately.

A best fit curve-fitting operation can be performed by the least squares method, using Equation (13) as follows:

$$\text{Sum} = \Sigma\{Zij - (Pi + Tx \cdot Xi + Ty \cdot Yj + f[Xi^2 + Yj^2])\}^2$$

Equation (13)

By so doing, the interpolation error can be eliminated.

Second Modified Example

An example of a best fit curve-fitting process will now be described wherein computed AS component data, that is laterally-shifted within a computer, and interference data that is not laterally-shifted, have different x, y-coordinate data (i.e., the case in which the lateral coordinates of the two sets of data do not lie on the same grid points).

This phenomenon, which we will call "lateral coordinates mismatch," is caused by various factors corresponding to the shape of the reference standard surface. When the reference standard surface is a plane, for example, in addition to lateral coordinates mismatch due to optical distortion in the interferometer, unless lateral shift conditions are accounted for, a mismatch can occur even in the absence of any optical distortion in the interferometer. For example, unless certain conditions are satisfied (such as setting the magnitude of the lateral shift to an integer multiple of the interval between the equally spaced sampling points), the lateral coordinates will not match. Note, however, that if there is optical distortion in the interferometer a lateral coordinates mismatch will always exist, regardless of the magnitude of the lateral shift.

This, of course, applies when the reference standard surface is spherical as well, i.e., there will always be a lateral coordinates mismatch if there is optical distortion in the interferometer. Even when there is no optical distortion in the interferometer, the lateral shifting of a spherical surface will cause "geometric distortion," which results in coordinates mismatch. The geometric distortion occurs when the sphere is shifted laterally, for example, because the spacing between sampling points, as they are projected onto the CCD imaging device, varies with the angle of the reference standard surface, i.e., (its tilt relative to the optical axis).

If instead of shifting a spherical surface laterally, it is rotated about the optical axis, the coordinates will still fail to match unless the following two conditions are met: 1) The axis of rotation must be properly set, and 2) the angle of rotation about the optical axis must be an integer multiple of 90 degrees. The case in which a coordinates mismatch exists due to rotation of a spherical surface will be considered later in the description of a third variation of the present invention.

Even when a lateral coordinates mismatch occurs due to the above factors, the data "(AVE–Dy)+$\underline{AS0}$," in the right side of Equation (10) can be treated as two independent sets of data, "AVE–Dy" and "$\underline{AS0}$." A best fit curve-fitting process is performed on the right side of Equation (10) using individual x, y-coordinates, as was done in Equation (13), and the resulting fitting coefficients added.

By so doing, it is possible to perform computations processing the data as a single set of data that has, in equivalent terms, been summed. The fact that curve-fitting process is performed separately on the individual data sets makes it possible to accomplish best fit curve-fitting even when the coordinates are not on the same grid points in both sets of data.

Third Modified Example

In addition, an example using waviness ABS (a wavefront generation extraction method), which seeks to provide absolute calibration of waviness level frequency, will now be described. This technique is used in conjunction with a method for reducing the number of iterations in rotation averaging, as disclosed in Japanese Patent Laid-open Publication H8-233552, which is hereby incorporated by reference. FIG. 2 shows, for example, how interferometric measurement data divided into 8 equal portions of equal circumference can be provided by four sets of interferometric measurement data at 0°, 180°, 90°, and 45°. To reduce the number of rotation averaging iterations, rotation coordinate conversion is performed in the processor to properly align the rotation direction of the data.

However, because the rotation coordinate conversion operation causes an x, y-coordinates mismatch (i.e., the x, y-coordinates of the data no longer lie on the same grid points after rotation), interpolation becomes necessary. Nevertheless, a filter is automatically applied during the interpolation operation. Therefore, if we consider subsequent processing of data obtained during RS fitting (to be described later) or by wavefront generation extraction, it becomes apparent that more than one interpolation will, in fact, be required. This will hamper the waviness measurement. To greatly reduce the effect of this filtering due to interpolation, the method to be described performs a non-interpolation best fit curve-fitting, with additional subsequent processing. Filtering, as desired by the user, is then applied to the final data obtained from this process.

In the following discussion, reference will be made to FIGS. 2A–2J to describe a procedure to arrive at virtual rotation-averaged data and AS components by weighting, adding, and subtracting a series of interferometric measurement data.

First, as shown in FIG. 2A, data for 0°, 180°, 90°, and 45° are taken and designated as ①, ②, ③, and ④. The data is obtained in multiple iterations of operations in which the test surface is rotated by discrete amounts and its shape data measured. Here, the positions of the arrows marked in each of the circles of FIG. 2A indicate the direction of the interferometric measurement data. The numerals associated with each direction are height information. A numeral "8," for example, means that shape data having a unit height of "8" was obtained as original data. An "F" in the center of a circle indicates that the data includes Fizeau surface shape error data. The direction of each circle in FIG. 2A is set such that the Fizeau surface is oriented in the same direction.

Figure 2B:
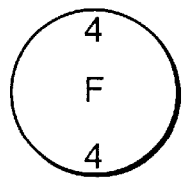
Figure 2C:
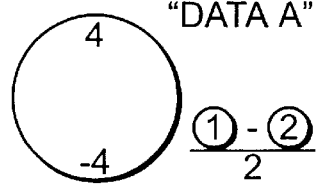
Figure 2D:
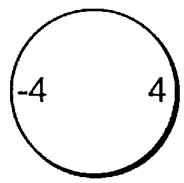

Next, the value of "(①+②)/2" is calculated, as shown in FIG. 2B, and in addition, the result of the calculation is subtracted from ① (the 0° data) as shown in FIG. 2C. The data obtained from this subtraction "(①−②)/2" is designated "Data a." At this time, Fizeau surface shape error data is included in "(①+②)/2," but in "Data a," the effect of the Fizeau surface has been canceled. As shown in FIG. 2D, "Data a" is rotated by 90 degrees to obtain "Data b."

Figure 2E:
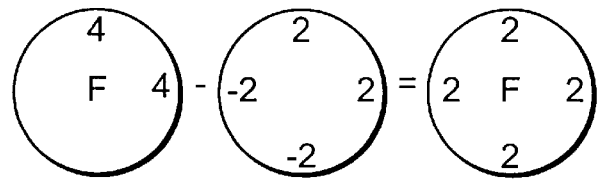
Figure 2F:
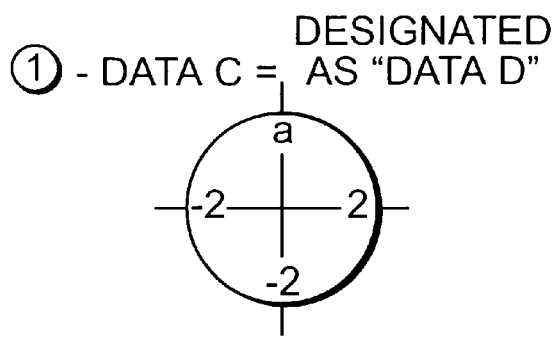
Figure 2G:
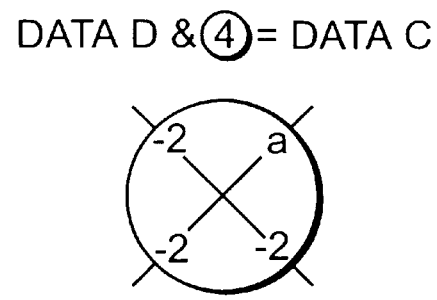

As shown in FIG. 2E, "(①+③)/2−(Data a+Data b)/2" is computed and the result designated "Data c." In addition, as shown in FIG. 2F, "①−Data c" is computed and the result designated "Data d." Also, as shown in FIG. 2G, "Data d" is rotated 45 degrees, and designated "Data e."

Figure 2H:
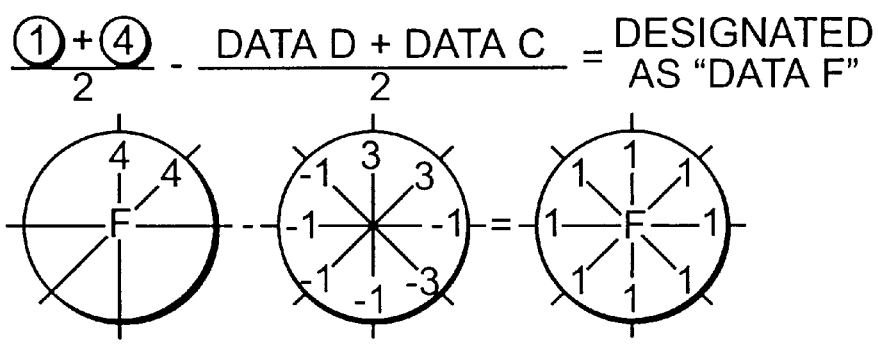
Figure 2I:
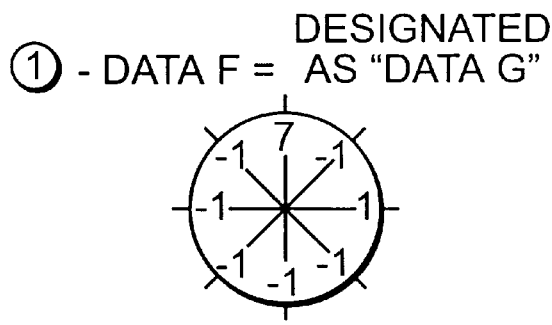
Figure 2J:
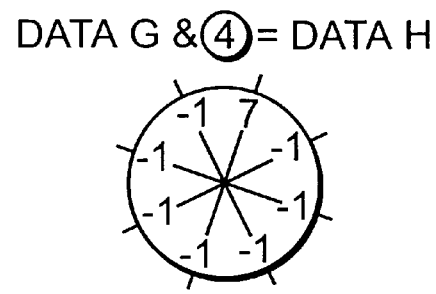

As shown in FIG. 2H, "(①+④)/2−(Data d+Data e)/2" is computed and the result designated "Data f." As is clear from FIG. 2H, "Data f"; has now become rotation-averaged data with equal weighting applied to its 0°, 45°, 90°, 135°, 180°, 225°, 270°, and 315° data. Also, "Data g," which is obtained by performing the computation "(①−Data f" is the 0° AS component. Thus by adding the rotation operations of the computations, the AS component of each direction can be obtained.

If data obtained as described above (virtual rotation-averaged data and AS components), are treated as independent data, as described for the second variation example, it is possible to effectuate perfect best fit curve-fitting using no interpolation. If, for example, rotationally symmetric distortion (sine condition distortion) is the main cause of lateral distortion error, even if the data are totaled for least squares curve-fitting processing, this will not produce an error as long as the interferometer has adequate horizontal resolution.

Fourth Modified Example

Figure 3A:
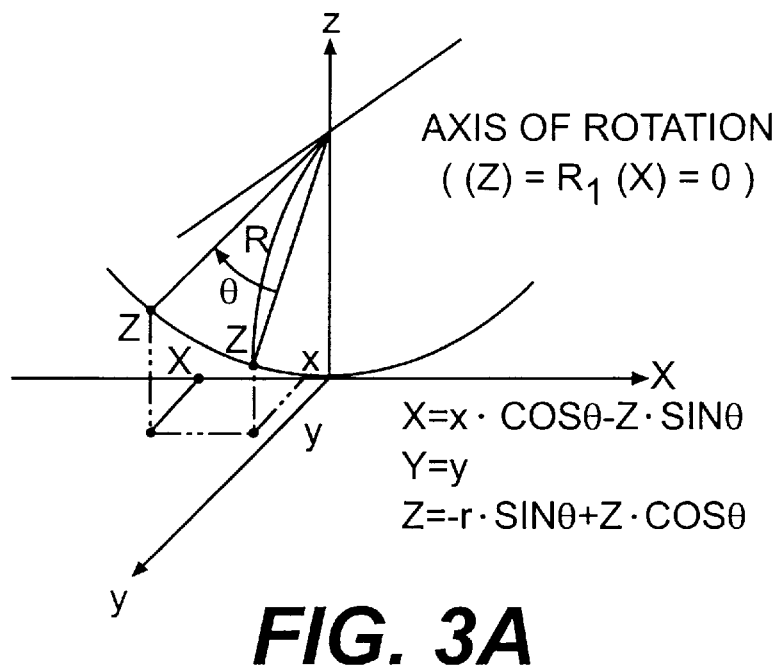
FIGS. 3A and 3B illustrates removal of computation error due to geometric distortion that occurs when the RS component and the AS component data are shifted laterally in a computer, with FIG. 3A showing removal of AS component errors, and FIG. 3B showing removal of RS component error.
Figure 3B:
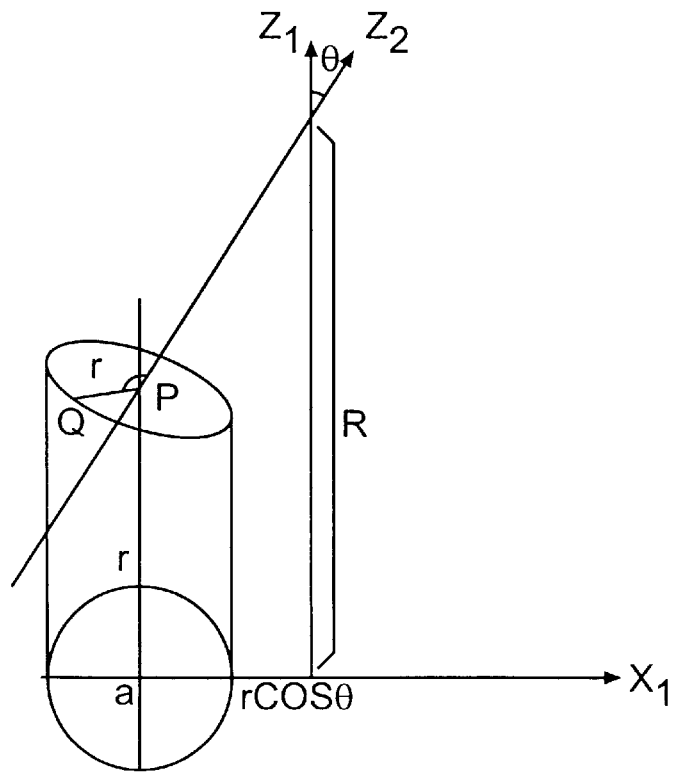

An example of the fourth variation of the present invention, is shown in FIGS. 3A and 3B, will now be described in detail, wherein the measurement waveform is non-planar and the elimination of computational error due to geometric distortion occurring when RS and AS components are laterally shifted in the computer.

As illustrated in FIG. 3A, for the AS component, it is possible to obtain perfect consistency of data before and after lateral shifting by performing coordinate conversion.

Equations (14) and (15) illustrate this proposition as follows:

$$X = x \cdot \cos\theta - z \cdot \sin\theta \qquad \text{Equation (14)}$$

$$Y = y \qquad \text{Equation (15)}$$

Thus we have the relationships as depicted by Equation (16) and (17) as follows:

$$z = (X^2 + Y^2)/R/[1 + \{(X^2 + Y^2)^{1/2} R\} - R \qquad \text{Equation (16)}$$

and $$\theta = \sin^{-1}(LS/R) \qquad \text{Equation (17)}$$

Since these coordinate values are accurately obtained, they can be used for best fit curve-fitting using Equation (13) to remove the computational error.

The consistency of lateral coordinates of the RS component of FIG. 3B will now be described in detail. An equation for expressing rotationally symmetric data with respect to (X2,Y2,Z2) coordinate-axis system in an (X1,Y1,Z1) coordinate-axis system can be derived as follows.

Assume that Point Q (X,Y,Z) of FIG. 3B is held at a specific distance r from Point P (a,0,b), and is located on a spherical surface that passes through the origin, with Point R (0,0,R) as its center. Assume also that the (X2,Y2,Z2) coordinate axis system is rotated by Θ° within the plane X1–Z1 with Point R (0,0,R) as the center of rotation. In this state, Point Q may be expressed by the equation $$(X-a)^2 + y^2 + (z-b)^2 = r^2 \qquad \text{Equation (18)}$$

Here, the following relationships apply:

$$z = (X^2 + Y^2)/R/[1 + \{1-(X^2+Y^2)\}^{1/2}/R] \qquad \text{Equation (19)}$$

$$a = [x - (R/\tan\theta)[\{1-(X^2+Y^2)\}^{1/2}/R]/(1+1/\tan^2\theta) = a[x,y] \qquad \text{Equation (20)}$$

$$b = a\,[x,y]/\tan\theta + R \qquad \text{Equation (21)}$$

By manipulating the above relational expressions, it becomes possible to express the locus obtained by projecting the locus of this point Q in the (X1,Y1) plane in terms of an ellipse defined by the following Equation (22):

$$\{(x-a)/\cos\theta\}^2 + y^2 = r^2 \qquad \text{Equation (22)}$$

(wherein the center shifts, dependent upon r). In other words best fit curve-fitting of the RS component can be performed by substituting in Equation (12), expressed in the (X2,Y2,Z2) coordinate system in Equation (23), as follows:

$$(\underline{X} - \underline{LS})^2 + \underline{Y}^2 = \{(X - a[X,Y])/\cos\theta\}^2 + Y^2 \qquad \text{Equation (23)}$$

Through the use of the above procedure it is possible to correlate the computed data before and after the lateral shift.

Of course, instead of performing non-interpolation best fit curve-fitting, as described in the second through fourth modified examples above, it is also permissible to perform the appropriate interpolations, convert the resulting data to equal-pitch data of the same interval, and perform best fit curve-fitting on that data.

Figure 4A:
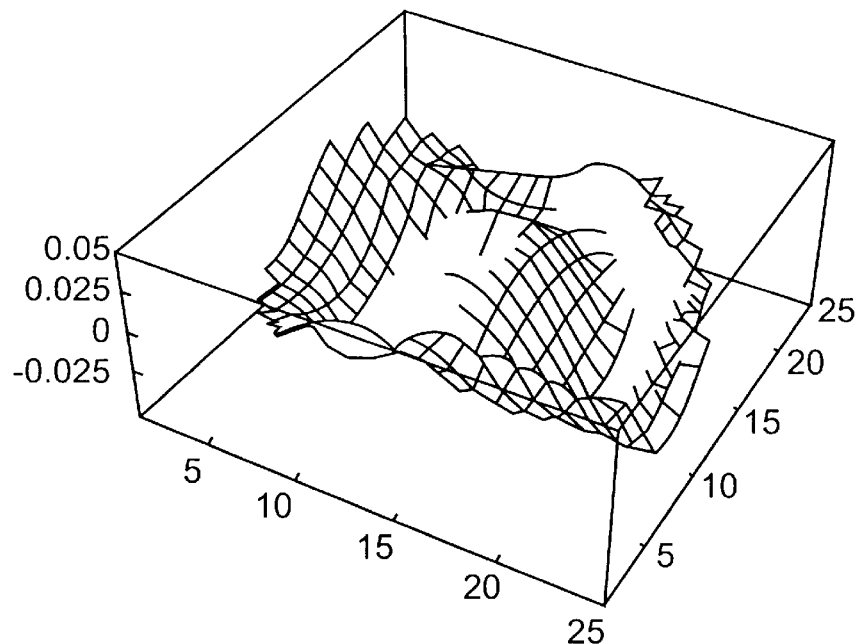
FIGS. 4A and 4B illustrate measurement results obtained by the wavefront generation extraction method, with FIG. 4A showing an equivalent wavefront, and FIG. 4B showing a separated calibration wavefront.
Figure 4B:
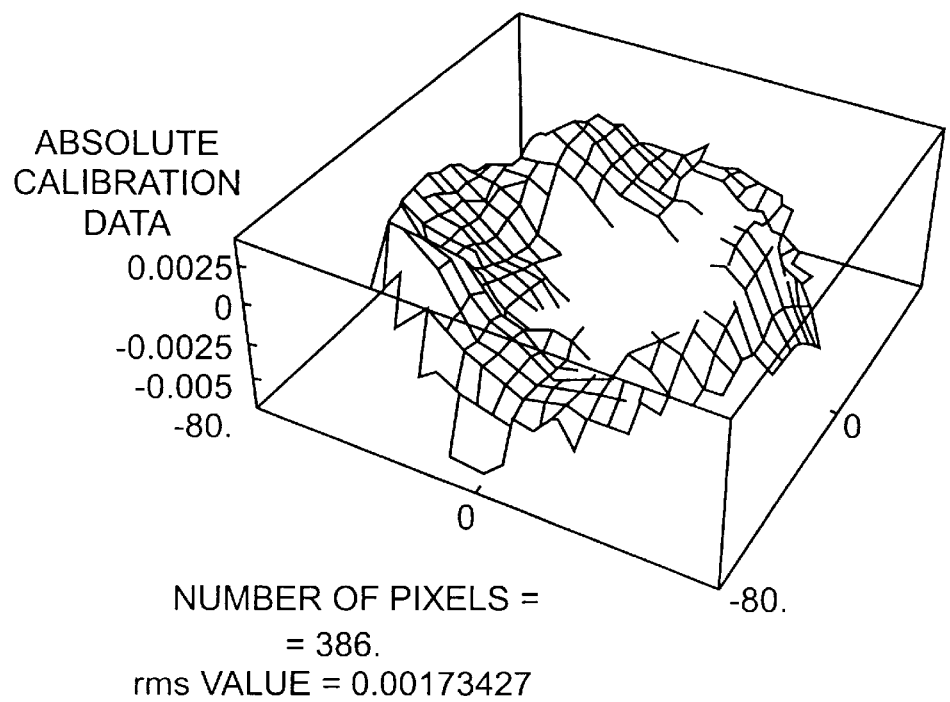
Figure 5A:
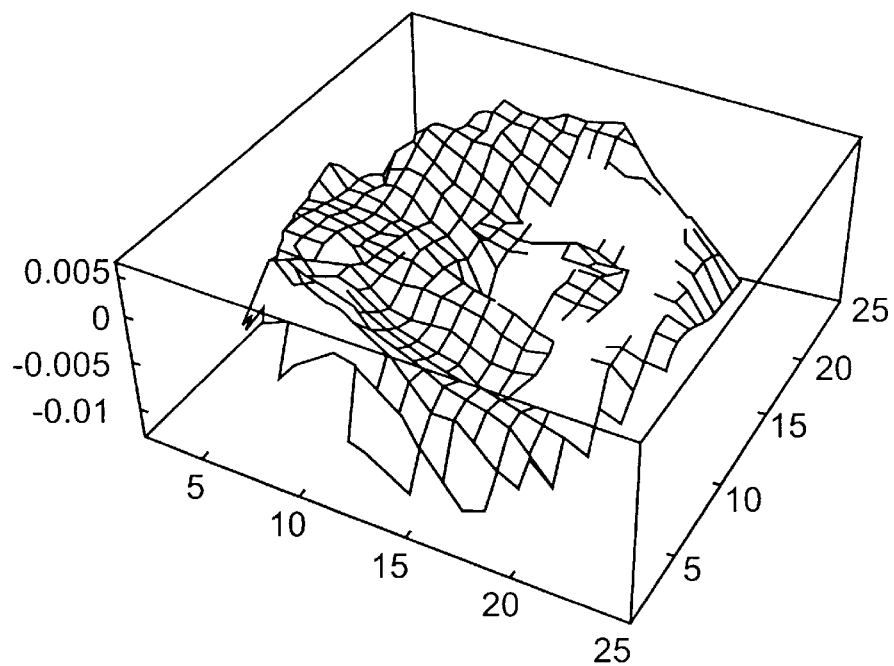
FIGS. 5A and 5B illustrates measurement results obtained by the wavefront generation extraction method from the same test surface (wavefronts), as shown in FIGS. 4A and 4B, but with a different equivalent wavefront from that in FIGS. 4A and 4B, with FIG. 5A showing an equivalent wavefront and FIG. 5B showing a separated calibration wavefront.
Figure 5B:
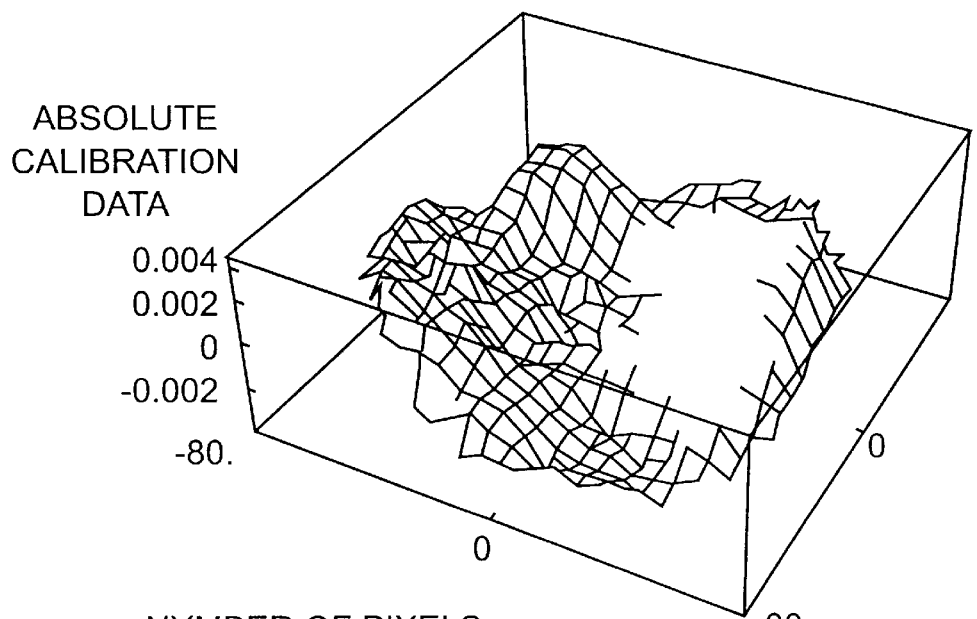
Figure 6:
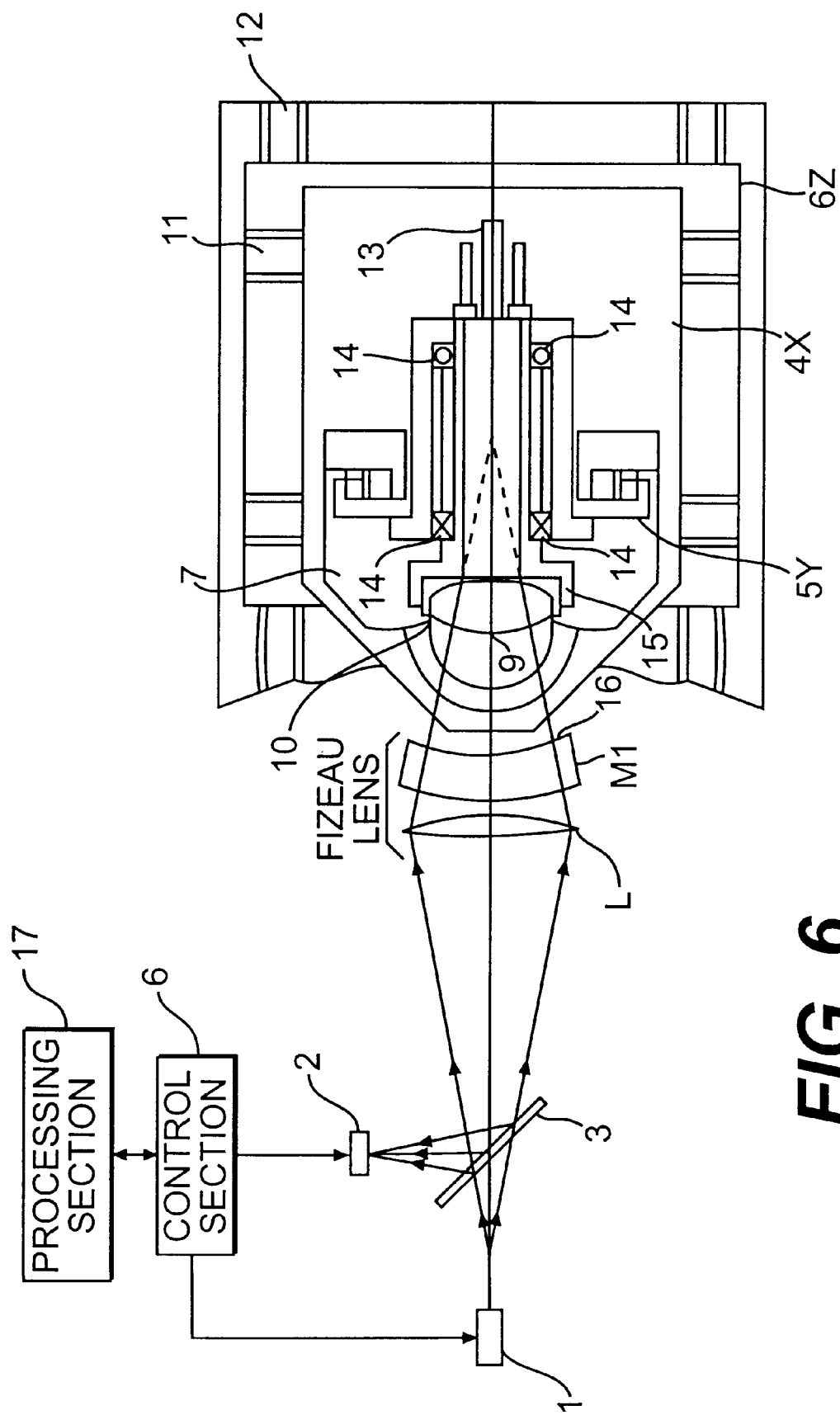
FIG. 6 illustrates an embodiment of the wavefront absolute calibration apparatus of the present invention.

FIGS. 4A and 5B show examples in which the above computations were performed on data from actual measurements using a Fizeau interferometer. The above wavefront generation extraction process was performed on two extremely different sets of data on a transmitted wavefront, as shown in FIGS. 4A and 5A, and compared to a separated calibration wavefront, as shown in FIGS. 4B and 5B, respectively, with an extremely good match seen between the shapes of FIGS. 4B and 5B. The shape shown in FIG. 4B was separated from the data shown in FIG. 4A and the shape shown in FIG. 5B was separated from the data shown in FIG. 5A.

Fifth Modified Example

A fifth variation of the computation method of the present invention for enhancing the reliability of ABS process original data will now be described. The reliability of rotation-averaged data is enhanced by checking for variations in the toroidal component of the interferometer reference surface (Fizeau surface) or of the test reference surface itself.

The example focuses on Equation (2). The method makes use of the fact that the toroidal component Td0 included in AS0 can be expressed as Equation (24), as follows:

$$TD0 = Tr\{(\cos\theta \cdot X + \sin\theta \cdot Y)^2 - (\sin\theta \cdot X - \cos\theta \cdot Y)^2\} \quad \text{Equation (24)}$$

the following relationship of Equation (25) holds true:

$$TDi - TDi+180 \approx 0 \quad \text{Equation (25)}$$

Here, $\theta$ is the angle in the direction of rotation of the cross-section that gives the highest power of the toroidal component with respect to the zero-degree reference. If it is assumed that only the toroidal component of the ASi components of Equation (2) is observed, then Equation (2) can be modified and represented as Equation (26), as follows:

$$DDi = F + RS + TDi + AGi \quad \text{Equation (26)}$$

From Equation (25), if we focus on the fact that the following relationship holds true as represented by Equation (27):

$$DDi - DDi+180 \approx 0 \quad \text{Equation (27)}$$

Then we can use the degree to which the value of the left side of Equation (27) approaches zero as a standard for determining whether rotation averaging was performed to a sufficient accuracy.

Also, if it is separately confirmed that the variation in the toroidal component has a fixed magnitude drift, it will be possible to allocate this error. The data can also be corrected, for example, using a correction magnitude that varies linearly over time.

In the following, an example of a procedure that can be used to check the toroidal component the reference toroidal component is designated "Ea."

① For 0° (A) data, verify that the alignment error correction is within tolerance, computes the computation origin, and checks aperture circularity.

② For 90° (B) data, verify that the separation between the computation origin and the center of the aperture is within tolerance, with the toroidal component found by subtracting "A" data from "B" data defined as "Tr [B−A]," verify that the relation "Tr [B−A]≦2×Ea+ϵ" is satisfied. Here, "ϵ" (≠0) expresses the tolerance and is set by performing null wavefront stability experiments.

③ For 180° (C) data, verify that the separation between the computation origin and the center of the aperture is within tolerance. With the toroidal component found by subtracting A data from C data defined as "Tr [C−A]," verify that the relation "Tr [C−A]≦ϵ" is satisfied.

④ For 270° (D) data, verify that the separation between the computation origin and the center of the aperture is within tolerance. With the toroidal component found by subtracting "B" data from "D" data, given as "Tr [D−B]," and the toroidal component found by subtracting "A" data from "D" data, given as "Tr [D−A]," verify that the relations "Tr [D−B]≦ϵ" and "Tr [D−A]≦2×Ea+ϵ" are satisfied.

The rotation average reference data H can now be found by taking the arithmetic average of the four data values: H=(A+B+C+D)/4, using post-error-correction alignment values of reference data A, B, C, and D that have passed the above checks.

Wavefront Absolute Calibration Apparatus

One embodiment of the wavefront absolute calibration apparatus of the present invention will now be described in detail. The operations and computations of the wavefront absolute calibration method described above can be performed using this apparatus. The present apparatus includes a control section 8; a processing section 17; a laser light source 1; an imaging device 2; a semi-transparent mirror 3; a collimating lens L-M1 (Fizeau lens); an X-stage 4, Y-stage 5, and Z-stage 6, which together constitute a tri-axis transport means for positioning a lens under test 10 (the part being measured) in the directions of the three axes; a bearing 14 (first rotation means); a $\theta$ stage 15; an $\alpha$ stage 7 (second rotation means); and a laser light source 13 (position check light source).

The control section 8 controls the imaging device 2 and the laser light source 13. The processing section 15 performs image processing.

The bearing 14 and the Θ stage 15 rotate the lens under test 10 about the optical axis. The $\alpha$ stage 7 rotates the optical axis of the lens under test 10 about the center of rotation 9.

A wavefront reflected from the lens under test 10 (the part being measured) is caused to interfere with a reference wavefront from the collimating lens L-M1. The shape error of the lens under test 10 is then measured by analyzing the resulting interference fringe pattern.

With such a configuration, the test lens can be rotated about the optical axis (Z-axis). The axis of rotation can be shifted in the X, Y, and Z-directions, and can also be rotated about the Y-axis.

In the above configuration, light omitted from the laser 1 becomes incident upon the semi-transparent mirror 3. A portion of this light is reflected by the reference surface 16 of the Fizeau lens L-M1. This reflected light returns to the semi-transparent mirror 3, where that light is directed upward to be incident on the imaging device 2.

Meanwhile, a portion of the light incident to the Fizeau lens L-M1 is formed thereby into an appropriate spherical wave to become incident to the test lens 10. The light is then reflected to again pass through the Fizeau lens L-M1 and return to the semi-transparent mirror 3, which bends it upward, directing it incident upon the imaging device 2.

The position of test lens 10 is then adjusted. If the shape of the test lens 10 roughly matches that of the spherical wave (wavefront) being created by the Fizeau lens L-M1, a fairly coarse interference pattern will be observed. The observed interference pattern provides the information on the difference between the shape of the test lens 10 and the shape of the spherical wave, i.e., wavefront aberration information, with one fringe being exactly equal to a half the wavelength ($\lambda$) of the light from the laser light source 1.

Accordingly, if the shape of the test lens 10 is nearly spherical, the overall interference pattern will have an appropriate level of coarseness and it will be possible, by analyzing the interference pattern, to measure the overall shape of the test lens 10 in one measurement.

As described above, by employing the absolute calibration method and absolute calibration apparatus of the present invention, it is possible to perform absolute calibration of measurement wavefronts used for interferometric measurement of precision reference standard surfaces such as planar or spherical surfaces.

Wavefront Synthesis Method

The underlying principles of the wavefront synthesis method of the present invention are discussed below, with reference to FIGS. 7A–7D and FIG. 8. To generalize the discussion, an example will be considered wherein a wavefront for the spherical surface of a lens under test is synthesized from a spherical surface wave. It should be noted that since there is no need to consider the power component (to be discussed later) when performing wavefront synthesis for a planar surface, neither is there a need to account for movement of the computation origin point or geometric coordinate distortion. This makes wavefront synthesis for planar surfaces much simpler than for spherical surfaces.

Japanese Patent Laid-open Publication No. 62-127601, which is hereby incorporated by reference, discloses a conventional alignment error correction method for spherical surfaces, whereby a computational method is utilized for the removal of curve fitting error during alignment error correction that is extremely high accuracy.

In general, for measurement data obtained by interferometry, alignment errors raw data are included in the measurement data W, as expressed by the following equation (from page 426 of *Optical Shop Testing*, John Wiley and Sons, which is hereby incorporated by reference):

$$W(xi,yi)=W0(xi,yi)+A+B\cdot xi+C\cdot yi+D\cdot(xi^2+yi^2) \quad \text{Equation (28)}$$

The coefficients A, B, C, and D in this equation represent the following errors: A is "piston error" (DC component error), B is X tilt error, C is Y tilt error, and D is power error.

W0 (xi,yi), which represents errorless data, can be obtained by removing the alignment error W-Wo with appropriate measurement techniques such as reference subtraction.

In the method of Japanese Patent Laid-open Publication No. S62-127601, which is hereby incorporated by reference, the test surface error (sphericity error for a spherical surface) is taken in a direction normal to the reference surface. The power error is written as a function in the form of "f ($xi^2,yi^2$) taken to an appropriate order. Then W can be expressed as $$W(xi,yi)=W0(xi,yi)+A+B\cdot xi+C\cdot yi+f(xi^2+yi^2) \quad \text{Equation (29)}$$

Partial measurement data for the test surface and/or reference standard surface are defined in the (X1,Z1) coordinate system of FIGS. 7A–7D, the Z1 axis represents the Fizeau effective center axis (interferometric measurement optical-axis) which is used to define the divergence angle of the interferometer reference surface. We shall assume that the first and second partial measurement data are obtained in terms of this coordinate system. Either the first or second partial measurement data may be used as the reference for joining the data, but for this example, the first data partial measurement is taken as the reference, to which the second partial measurement data is to be joined.

In a first configuration of the test area, as shown in FIG. 7A, the test surface is measured at the reference wavefront of divergence angle $\Theta 1$. Partial measurement data D1 is obtained by applying the alignment error corrections using Equation (29) to the subtraction data obtained by subtracting the absolute shape (sphericity) of the reference wavefront from the measurement data. The partial measurement data D1 then becomes the sphericity data (equal to the absolute calibration results), with the most significant best approximation sphere S1 that can be determined in the area of the test surface, as defined by the range of divergence angle $\Theta 1$, as the reference. In FIG. 7A, the center of the best approximation sphere S1 is indicated by G1.

In a second configuration of the test area, as shown in FIG. 7B, the test surface is measured at the reference wavefront of divergence angle $\Theta 2$. Partial measurement data D2 is obtained by applying the alignment error corrections using Equation (29) to the subtraction data obtained by subtracting the absolute shape (sphericity) of the reference wavefront from the measurement data. The partial data D2 then becomes sphericity data (equal to the absolute calibration results), with the most significant best approximation sphere S2 that can be determined in the area of the test surface, as defined by the range of divergence angle $\Theta 2$, as the reference. In FIG. 7B, the center of the best approximation sphere S2 is indicated by G2.

Therefore, in both sets of partial measurement data D1 and D2, the alignment error of Equation (29), as defined in the (X1, Z1) coordinates system, is zero.

The portions marked by the heavy lines in FIGS. 7A and 7B are the areas in the (X1,Y1) plane common to both sets of partial measurement data, D1 and D2 (the overlap area). The best approximation spheres that are determined in the reference overlap areas are indicated by T1 and T2. The centers of these best approximation spheres T1 and T2 are P1 and P2, respectively.

In FIGS. 7A and 7B, with "P1≠G1" and "P2≠G2," the points are drawn with P1 not matching G1, and P2 not matching G2. This is the case because when the areas defining the best approximation spheres are different, even when for example, the data for an area that is a portion of the measurement data is extracted from that measurement data, there is no guarantee that the center of curvature of the best approximation spheres will match. However, since the relation "T1=T2+alignment error" will always hold true, this fact can be relied upon to join the two sets of partial measurement data (D1 and D2) as described below.

The alignment error correction of Equation (29) is first performed for the overlap area data T1 of the partial measurement data S1. As shown in FIG. 7C, the effect of this operation is seen in the moving of P1, the sphere center of T1, to point P1' on the Z1-axis. The correction error resulting from the Equation (29) alignment error correction is then oppositely added to the data represented by the entire surface S1. As shown in FIG. 7C, this operation is shown by the moving of G1, the sphere center of S1, to point G1'.

Similarly, the alignment error correction of Equation (29) is first performed for the overlap area data T2 of the partial measurement data S2. As shown in FIG. 7C, this operation is shown by the moving of P2, the sphere center of T2, to point P2' on the Z1-axis. In addition, the correction error resulting from the Equation (29) alignment error correction is added to the data corresponding to entire surface S2. As shown in FIG. 7D, the effect of this operation is seen in the moving of G2, the sphere center of the surface S2, to point G2'.

Figure 8:
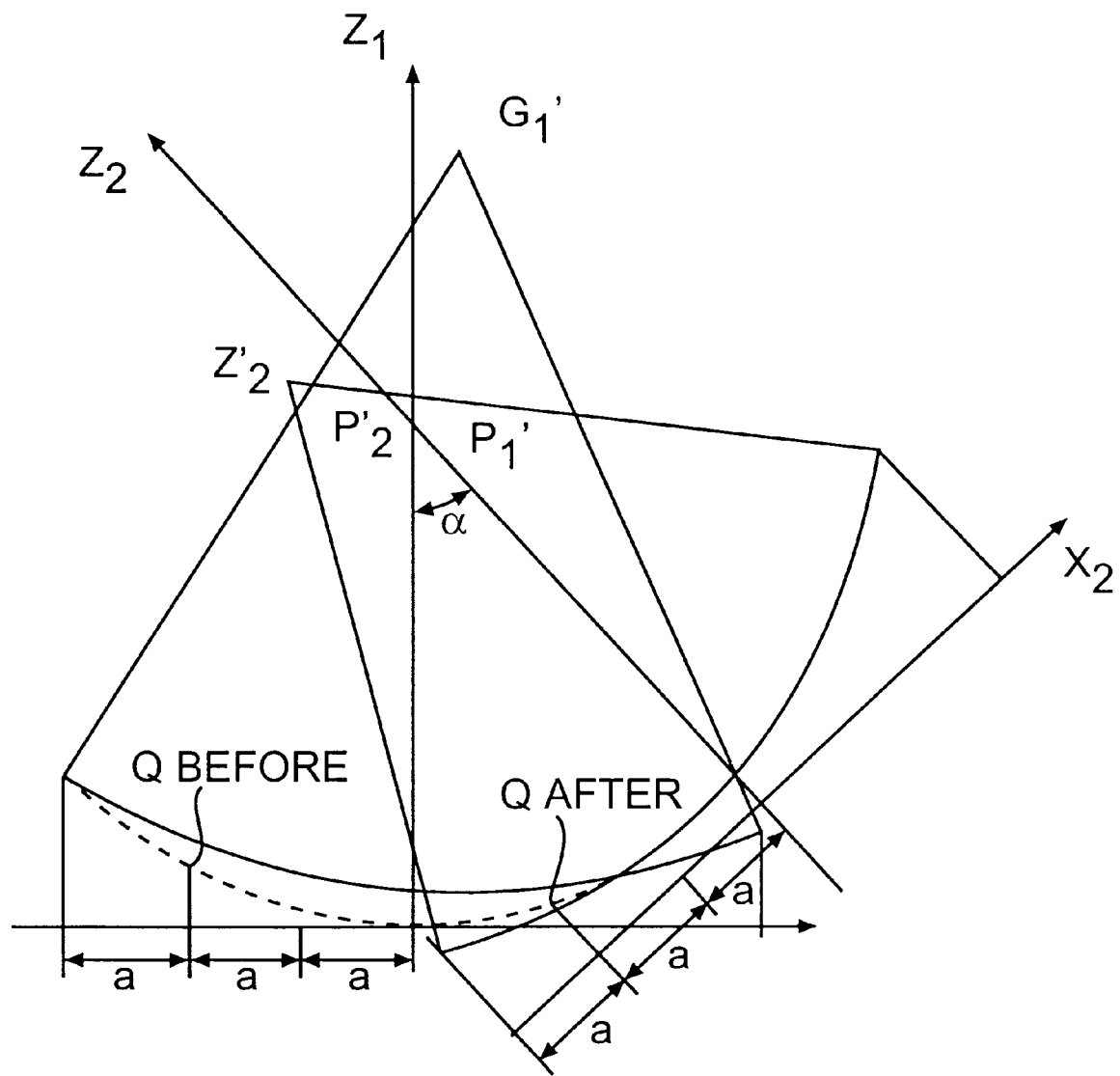
FIG. 8 shows two sets of data for the spherical test surface joined with the data of FIG. 7B in the overlap area.

As shown in FIGS. 7C and 7D, T1' and T2', which were obtained in the above operations, are located in the same spherical surface. In other words, since P1'=P2', as shown in FIG. 8, if proper rotation, centered on the sphere center P1' (which is equal to P2'), is performed and if lateral coordinate consistence can be maintained, then a perfect match between the two sets of data is possible. This is based on the fact that because the interferometer measurement data and the Equation (29) alignment error correction data become the sphericity data in the normal direction of the wavefront, and the measurement data experiences essentially no change due to rotation about the center of the sphere.

If the reference surface itself defined by an opening angle (the outer diameter in the case of a plane) has distortion, it must be corrected. The reason for this is that if the reference surface has distortion, the wavefront of the common area (overlap area) of the test surface will interfere with a different location in the reference wavefront.

For example, approximate interpolation can be performed such that in the (X1,Y1plane, the S1' and S2' computed data will be equally spaced data. (Thus interpolation is also automatically performed for T1' and T2'.) This post-interpolation computed data will be designated S1" (T1") and S2" (T2").

The geometrical distortion that occurs when data are actually joined will now be considered. This problem arises only when the reference wavefront is non-planar. As mentioned earlier, suppose that the first partial measurement data are used as the reference and the second partial measurement data will be joined to the first one with an overlap. As shown in FIG. 8, this operation rotates data T2", with the sphere center P1' (P2') as the center of rotation, until it is the equivalent by matched with T1". The coordinate system here is designated the (X2,Y2) system. Therefore, when actual measurement in the actual (X1,Y1) coordinate system is performed, for example the test area, and not the measurement system, is rotated in the opposite direction.

Even if T1" or T2" are converted to measurement data of perfectly equal pitch in the (X1,Z1) coordinate system, for example, the coordinates will not match after coordinate conversion (ΔΘ rotation). The reason for this is discussed below, with reference to FIG. 8.

If it is assumed that one point $Q_{before}$ in T1" has the X-coordinate value −2a in the (X1,Z1) coordinate system and the arc of T1" is partitioned to have three points with the respective X coordinates separated by pitch "a" as shown in FIG. 8, and $Q_{before}$ is moved to the point $Q_{after}$ due to rotation by an angle α and if the radius of the spherical surface having points $Q_{after}, Q_{before}$ is R. Then from the following relationship:

$$a \neq R\ \sin[\sin^{-1}(3a/R) - \sin^{-1}(2a/R)], \quad \text{Equation (30)}$$

it is clear that the pitch in the (X2,Z2) coordinate system will be different from pitch "a" and the lateral coordinates after rotation will not match the before-rotation coordinates. Therefore, except for measurements taken in a plane and where only parallel moves are performed, it is always necessary to perform corrections (interpolation) to correct for the shift in lateral coordinates due to this type of geometric distortion.

By performing, for final joined data obtained by the above procedure, additional alignment error corrections in the (X1,Y1) coordinate system, according to Equation (29), the sphericity error for the entire measurement surface (or flatness error, if the surface is a plane) can be computed.

Figure 9:
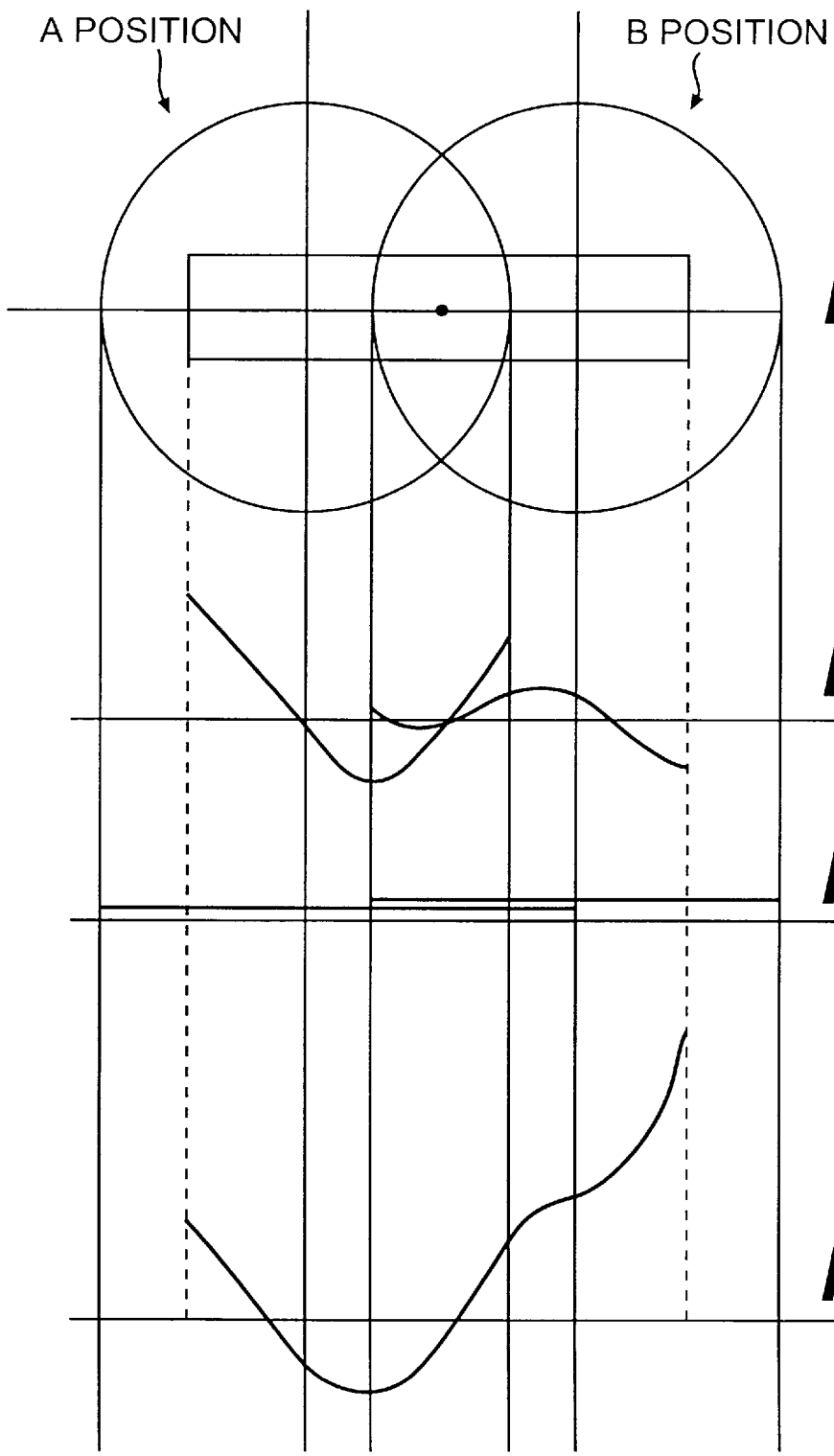
FIGS. 9A–9B show in the data joining for a planar test surface, with FIG. 9A showing the placement of the test surface, with FIG. 9B showing typical partial measurement data after removal of reference wavefront shape errors, with FIG. 9C showing lateral coordinate consistency after distortion correction, with FIG. 9D showing shape data obtained by joining two sets of partial measurement data.

Application of the Wavefront Synthesis Method of the Present Invention to a Planar Surface FIGS. 9A–9D illustrate the wavefront synthesis method of the present invention applied to a planar surface, which will now be described in detail. FIG. 9A illustrates the positional relationships of a test surface when measurement data are joined in a planar surface. FIG. 9B, which is similar to FIG. 15C, shows typical partial measurement data of a reference wavefront after removal of shape errors. Unlike FIG. 15D, this drawing shows the state in which only the alignment (tilt) errors remain in respective partial measurement data.

To remove the shape error from the reference wavefront, an absolute calibration of the reference standard surface is performed and, from reference subtraction data, additional correction computations are performed in the interferometer computer to correct for the absolute shape of the reference standard surface. Many different absolute calibration methods are provided for calibrating this reference standard surface.

FIG. 9C is similar to FIG. 15E, which represents distortion. It shows the state wherein the lateral coordinates for the shape error information of FIG. 9B have been made perfectly consistent (no shift in position) by performing distortion correction on the various partial measurement data. This distortion correction consists of determining the locations on the test surface that are being sampled by the equal-pitch CCD pixels, i.e., determining the amount of lateral coordinate shift, and interpolating the shape error data based on the lateral coordinate shift, to thus convert the data to equal-pitch data on the test surface.

FIG. 9C shows that the sampling points match when the test surface is placed in the "A Position" and "B Position," as indicated in FIG. 9A.

Figure 10:
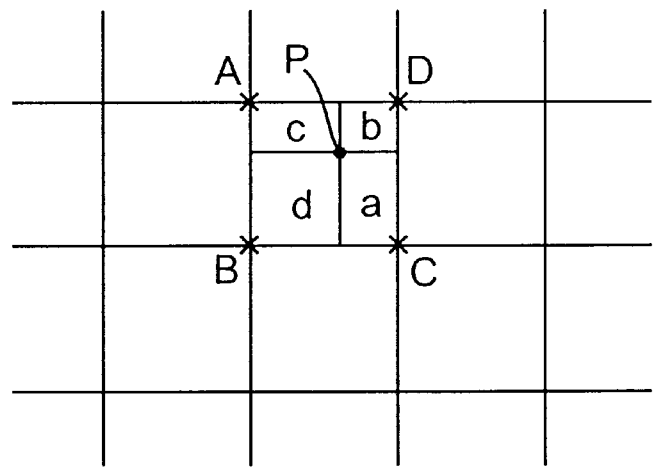
FIG. 10 illustrates an interpolation operation performed for a planar test surface.

FIG. 10 shows one method of interpolating to convert data to equal-pitch shape error data by area superimposition which is normally performed by the finite element method. In other words, in this interpolation method, when the vertical coordinates of the equal-pitch coordinate points on the test surface, marked by "X" (the crossed lines) in FIG. 10 are known, the vertical coordinate value of the point "P" in FIG. 10 is given by Equation (31) as follows:

$$P = (A \cdot a + B \cdot b + C \cdot c + D \cdot d)/(a+b+c+d) \quad \text{Equation (31)}$$

where upper case "A" through "D" represent the vertical coordinate values of each point and lower case "a" through "d" represent the areas of the corresponding sub-images.

Conversely, since in the present invention, it is the vertical coordinate value of point "P" that is known, this value can be allocated back to the coordinate points (the "X" marks in FIG. 10) using the same Equation. That is, the data for points "P" (CCD sampling points) are reallocated, with the CCD pixel area covered by each such point accounted for as a weighting factor, a weight applied to each coordinate point, and the values arithmetically averaged, to thereby complete the interpolation.

After the above preliminary operations have been completed, statistical data processing is performed to obtain a match between the data in the areas of overlap in the two sets of partial measurement data in FIG. 9B. Specifically, this can be done by computing difference data for these two sets of data, and from this, computing the tilt error magnitude (using the least squares method, for example) to establish correlation between the best approximation planes of the two sets of partial measurement data. This is the same as the process described earlier for a spherical surface.

FIG. 9D shows the data obtained by joining the "B Position" partial measurement data of FIG. 9A to the "A position" data (with the "A position" data as the reference). Finally, an additional alignment (tilt) error correction must be performed on the full surface data of the test surface. By using the above procedure, it is possible to perform shape measurement of the full surface of a plane.

Procedure Using Non-interpolation Curve-Fitting

It is also possible to use a procedure wherein the data are joined by a non-interpolation best fit curve-fitting process, i.e., without performing the above interpolation (lateral coordinate error correction) to obtain equal-pitch data. The above interpolation is then performed after the measurement data are joined. The reason for using this procedure is to remove the influence of waviness error, which can occur due to interpolation, especially when the overlap areas involved are small.

Figure 11:
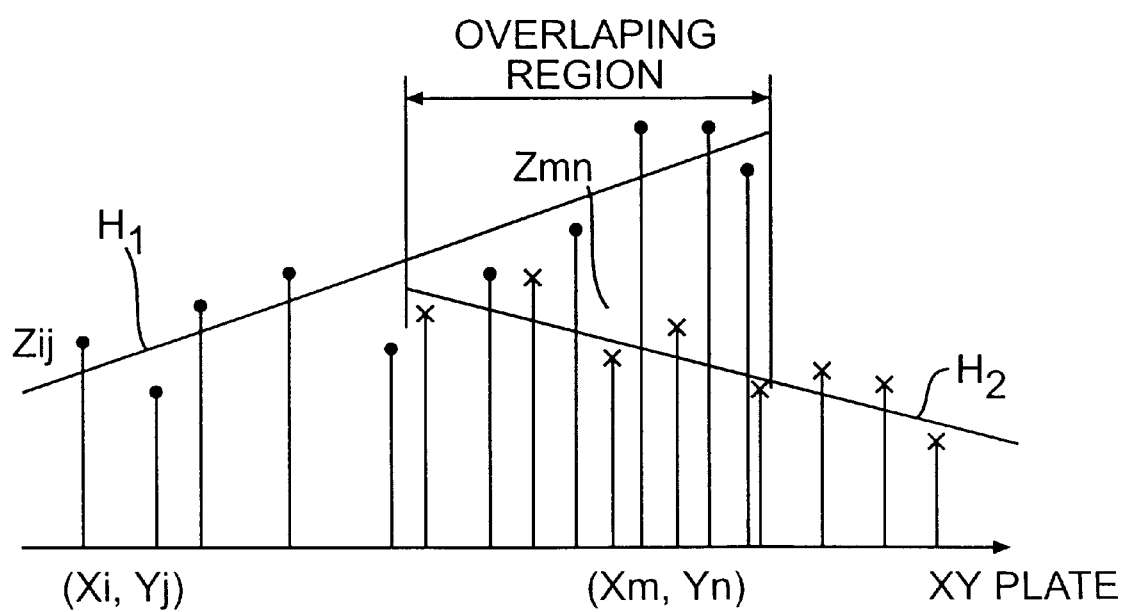
FIG. 11 shows non-interpolation curve-fitting in a planar test surface.

Suppose that the test surface is a plane, a first set of measurements is indicated by the large dots in FIG. 11, and a second set of measurements is indicated by the "x" marks for simplicity. Then the best approximation planes for the first and second sets of measurements are designated as "H1," and "H2," respectively.

With the portions of each set of data recognized as being within the area common to both sets of data (the overlap area) expressed as $(x_i, y_j, z_{ij})$ and $(x_m, y_n, z_{mn})$, by first applying the least squares method separately to $$\text{Sum1} = \Sigma(z_{ij} - p1 - a1 \cdot x_i - b1 \cdot y_j)^2 \qquad \text{Equation (32)}$$

and $$\text{Sum2} = \Sigma(z_{mn} - P2 - a2 \cdot x_m - b2 \cdot y_n)^2 \qquad \text{Equation (33)}$$

we compute (p1, a1, b1) and (p2, a2, b2). Then, based on the difference values of the coefficients thus obtained ($\Delta p$, $\Delta a$, $\Delta b$), if "$\Delta p + \Delta a \cdot xi + \Delta b \cdot yj$," for example, is added to the partial data of the first set of measurements, the data of the first and second sets of measurements will be joined smoothly. By using the above procedure to join data we can remove the influence of the waviness error due to interpolation.

Eliminating Edge Effects

Figure 12A:
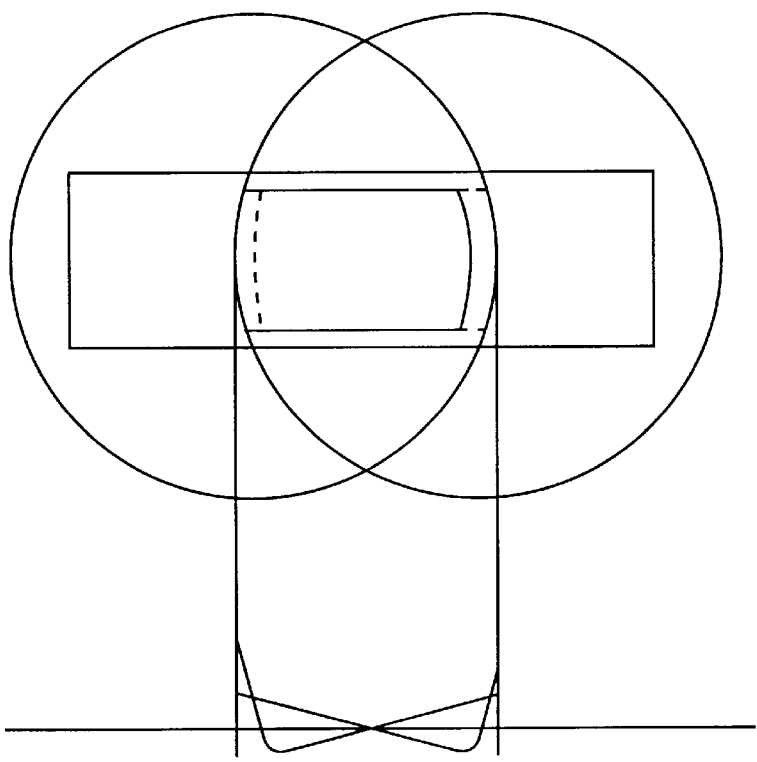
FIGS. 12A and 12B show the effect of edge error, with FIG. 12A showing the placement of the test surface and FIG. 12B showing the partial area data affected by edge error.
Figure 12B:

Referring to FIGS. 12A and 12B, a procedure is provided for joining data with good accuracy by eliminating errors due to edges, etc. that may exist in each of partial measurement data in the overlap area even after the above-mentioned procedures are performed.

FIGS. 12A and 12B illustrates the effects of edge error. In an effort to keep the related discussion simple, only errors in the overlap area are considered and the test surface is assumed to be a perfectly flat plane. FIG. 12B shows an example of measurement data for the effective Fizeau areas of the two sets of partial measurement data shown in FIG. 12A in which there are raised edges at the periphery for diffraction. Consequently, this data, which should have been curve-fitted to essentially zero deviation, includes tilt error due to the effect of the edges, as shown in FIG. 12B. Therefore, if this data is processed for joining as-is, an unnecessary tilt error correction will end up being applied making it impossible to get an accurate shape measurement.

Interferometers normally have an edge removal function and if this provides adequate deletion of edges there will be no problem. If the number of edges to be deleted is too large, however, the edge deletion process makes the overlap areas too small which increases joining errors due to data dropout. This can be avoided by performing best fit curve-fitting on the difference data and re-computing the optimum overlap areas based on the size of the curve-fitting deviation.

Specifically, the process is performed by proceeding, in order, from the data with the fewest edges to be removed to the data with the most edges and continuing until saturation of deviation reduction. At this point the data will have been joined with optimum overlap areas.

This technique is not necessarily limited to cases in which the data is being affected by edges. It can also be useful, for example, when deviations of portions of the data are clearly too large. Here, weighting can be applied during curve-fitting, with less weight given to the parts of the data with large deviations. This technique can prevent data-joining degradation caused by parts of the data being inconsistent due to any number of factors not necessarily related to the shape of the test surface.

The above procedure, to preclude having edges affecting the data deviation, allows more precise data joining and may be applied to spherical surfaces as well as plane surfaces.

Eliminating Interferometry Random Error

Having eliminated the above errors, the last interferometric measurement error that remains will be random error. A method for addressing random error will now be described below.

Figure 13:
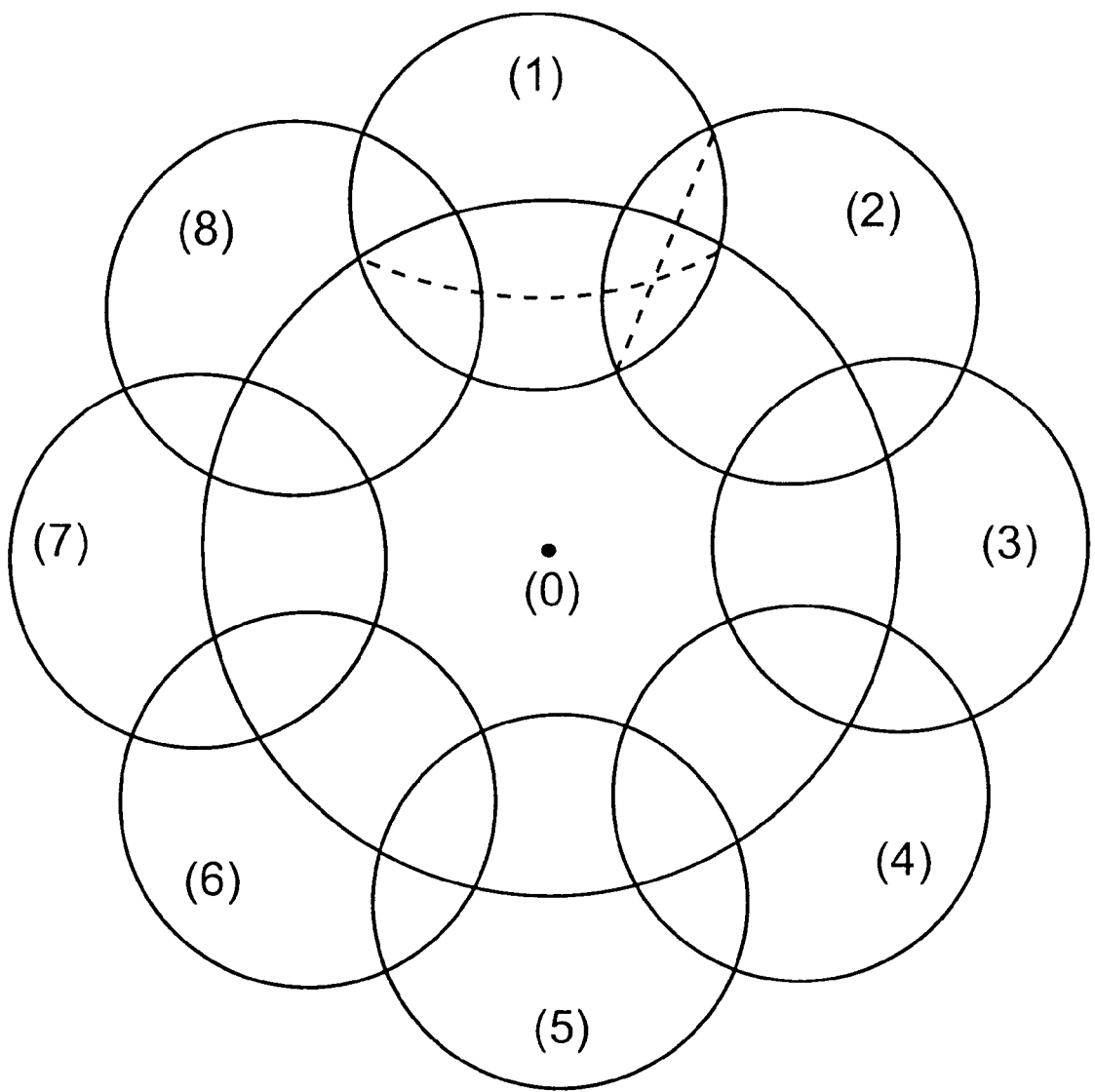
FIG. 13 shows a method of eliminating random errors when data are arranged such that multiple sets of partial measurement data can be linked in a closed system forming a ring.

When multiple sets of partial measurement data are arranged such that it is possible to link them in a closed system to form a ring, as shown in FIG. 13, random error can be eliminated by distributing the error either equally or with weighting, from a forward/reverse equation.

For example, in the partial measurement data arrangement, as shown in FIG. 13, if the different overlap areas are designated "$T_{ij}$," and the magnitudes of the alignment errors intermixed with the sets of partial measurement data in those areas are expressed as "$T_{ij(i)}$, and $T_{ij(j)}$," respectively, then, for the desired closed system, the following equation is true:

$$\Sigma T_{i,i+1}(i) = \Sigma T_{i, i+1}(i+1) \qquad \text{Equation (34)}$$

Therefore, the separation of this equation can be regarded as the result of random error, and the random error is distributed, either equally, or with weighting. FIG. 13, shows the central data (0) as the reference. The partial measurement data are combined at eight locations (1) through (8) around the circumference, to form the data ring.

Figure 14:
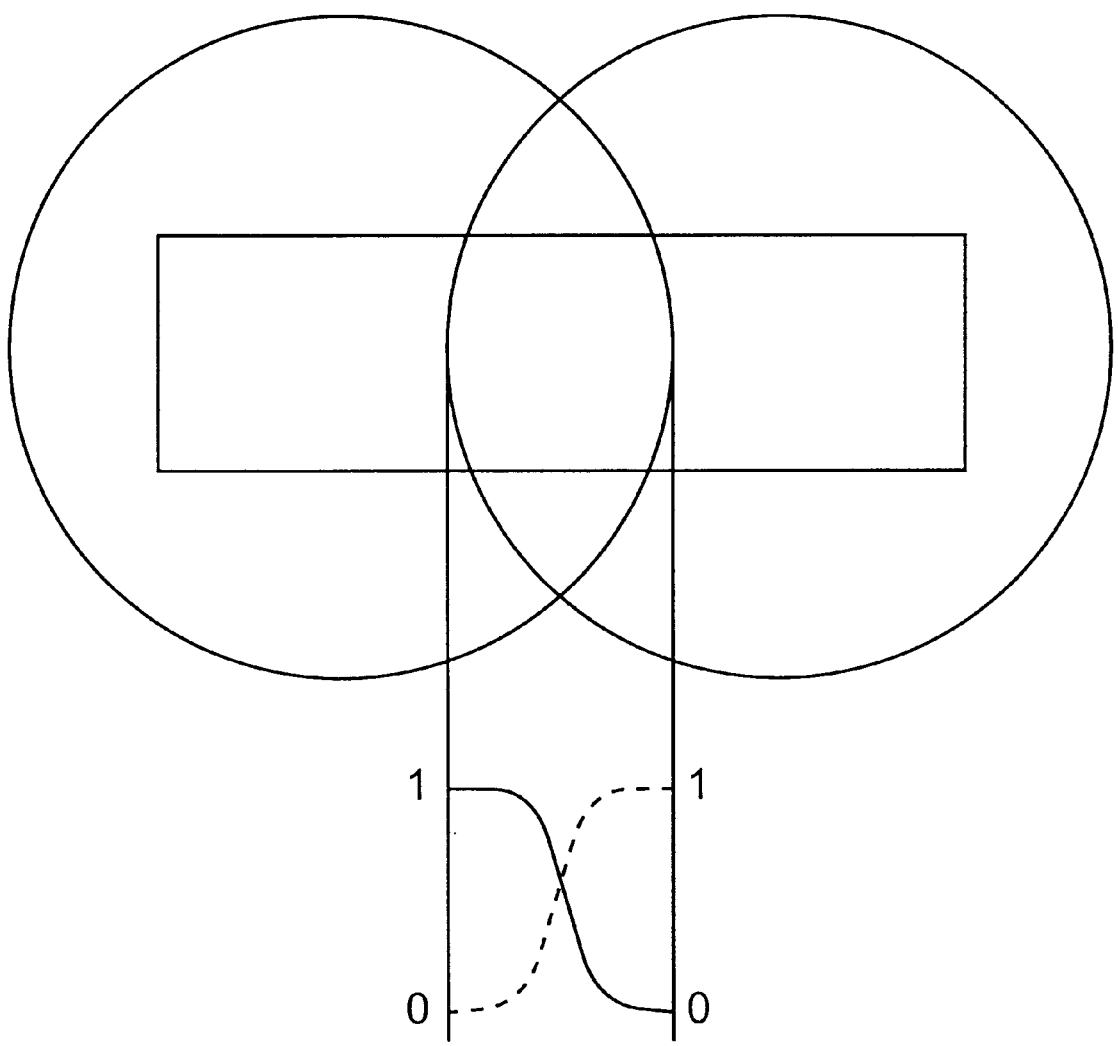
FIG. 14 shows a wavefront synthesis method in which arithmetic averaging is performed after weighting is applied to the partial measurement data.

A method that also serves to mitigate random error in interferometric measurement data is illustrated in FIG. 14. In this method, after applying the weighting, as shown in FIG. 14, to each set of partial measurement data, the two sets of data are arithmetically averaged. For a weighting function, for example, the following functional expression, which appears on page 202 of *The Mathematical Description of Shape and Form* (John Wiley and Sons), which is hereby incorporated by reference, may be used:

$$g(\theta) = \theta^2(3 - 2\theta), \qquad \text{Equation (35)}$$

as may the similar function, $$g(\theta) = \{1 - \cos(\theta \times \pi)\}/2 \qquad \text{Equation (36)}$$

where $\theta$ is a lateral coordinate standardized for the total length of the overlap area and both satisfy "g(0)=0","g(1)= 1", and "g'(0)=g'(1)=0".

According to the present invention, in addition to removing lateral coordinate errors in partial measurement data, partial area data are joined, thus ensuring consistency of data in waveform synthesis overlap areas.

It will be apparent to those skilled in the art that various modifications and variations can be made in the apparatus and method for wavefront absolute calibration and the method of synthesizing wavefronts of the present invention without departing from the spirit or scope of the invention. Thus, it is intended that the present invention cover the modifications and variations of this invention provided they come within the scope of the appended claims and their equivalents.

What is claimed is:

1. A method of deriving an absolute surface profile of an object having a rotationally symmetric component and a rotationally asymmetric component using a detection system for measuring a relative surface profile of the object with respect to a reference surface, the method comprising the steps of:

positioning the object to a first position relative to the detection system;

rotating the object around an axis of rotation at the first position;

acquiring data indicating the relative surface profile of the object with respect to the reference surface at each of a plurality of rotational positions of the object during the rotating step;

averaging the data acquired in the acquiring step over the plurality of rotational positions to derive rotationally averaged data that are averaged over substantially a full rotation around the axis of rotation;

processing the rotationally averaged data and the data indicating the relative surface profile of the object at at least one of the plurality of rotational positions of the object to derive the rotationally asymmetric component of the absolute surface profile of the object;

laterally translating the object to a second position relative to the detection system;

acquiring data indicating the relative surface profile of the object at the second position; and processing the data indicating the relative surface profile of the object at the second position and at least one of the rotationally averaged data and the data indicating the relative surface profile at at least one of the plurality of rotational positions of the object to derive the rotationally symmetric component of the absolute surface profile of the object.

2. An interferometric measurement apparatus for deriving an absolute surface profile of an object having a rotationally symmetric component and a rotationally asymmetric component, the apparatus comprising:

a reference surface;

an interferometric optical detection system for outputting data representing a relative surface profile of the object relative to the reference surface;

a rotation mechanism for rotating the object;

a lateral translation mechanism for laterally translating the object; and a processor in communication with the interferometric optical detection system for processing the data outputted from the interferometric optical system, wherein the processor acquires data from the interferometric optical detection system indicating the relative surface profile of the object, with respect to the reference surface at each of a plurality of rotational positions of the object while the object is rotated around an axis of rotation, the processor averaging the data acquired over the plurality of rotational positions to derive rotationally averaged data that are averaged over substantially a full rotation around the axis of rotation, the processor further processing the rotationally averaged data and the data indicating the relative surface profile of the object at at least one of the plurality of rotational positions of the object to derive the rotationally asymmetric component of the absolute surface profile of the object, and wherein the processor acquires data indicating the relative surface profile of the object at a position laterally shifted from one of the plurality of rotational positions relative to the interferometric optical detection system, the processor processing the data indicating the surface profile of the object at the laterally shifted position and at least one of the rotationally averaged data and the data indicating the relative surface profile at at least one of the plurality of rotational positions of the object to derive the rotationally symmetric component of the absolute surface profile of the object.

3. A wavefront absolute calibration method for separating surface accuracy errors of a reference surface and surface accuracy errors of a test surface from interferometric measurement data indicating a relative surface profile of the test surface with respect to the reference surface, the wavefront absolute calibration method comprising the steps of:

extracting a rotationally asymmetric component error of the test surface, including:

generating a rotationally symmetric wavefront having only a rotationally symmetric component of the surface accuracy errors by averaging a plurality of interferometric measurement data that are measured at a plurality of rotational positions of the test surface while the test surface is rotated about an optical axis; and subtracting rotationally averaged data representing the rotationally symmetric wavefront from the interferometric measurement data measured at one of the plurality of rotational positions of the test surface to extract data representing the rotationally asymmetric component error;

extracting a rotationally symmetric component error of the test surface, including:

measuring the interferometric measurement data at a laterally shifted position of the test surface that is laterally shifted from the one of the plurality of rotational positions;

subtracting one of the rotationally averaged data and the interferometric measurement data measured at the one of the plurality of rotational positions from the interferometric measurement data measured at the laterally shifted position of the test surface to derive subtracted data;

calculating lateral shift data corresponding to changes in the data representing the rotationally asymmetric component error due to the lateral shift of the test surface; and processing the lateral shift data, the subtracted data obtained in the subtracting step, and the data representing the rotationally asymmetric component error extracted in the step of extracting to derive data representing the rotationally symmetric component error of the test surface; and adding the rotationally symmetric component error and the rotationally asymmetric component error to derive an absolute accuracy error of the test surface, wherein the step of extracting the rotationally symmetric component error includes performing best curve-fitting for lateral shift data representing the rotationally symmetric component error measured at the laterally shifted position using a polynomial to extract the rotationally symmetric component error.

4. The wavefront absolute calibration method according to claim 3, wherein when sampling points of the interferometric measurement data for the test surface are unequally spaced in a predetermined coordinate system due to distortion in the interferometric measurement data, the interferometric measurement data are calibrated by performing alignment error correction using coordinate values of the sampling points in the predetermined coordinate system.

5. The wavefront absolute calibration method according to claim 3, wherein when sampling points of the lateral shift data do not have the same coordinate values in the predetermined coordinate system as sampling points of the interferometric measurement data measured at at least one of the plurality of rotational positions, best curve-fitting is performed using the coordinate values of each of the sampling points.

6. The wavefront absolute calibration method according to claim 3, wherein the rotationally symmetric component error and the rotationally asymmetric component error are treated as a data set including a plurality of interferometric measurement data corresponding to different coordinate values obtained by rotation computation to reduce the number of rotations in the step of generating the rotationally symmetric wavefront.

7. The wavefront absolute calibration method according to claim 3, wherein when the test surface is non-planar, geometric distortion received by the rotationally symmetric component error and the rotationally asymmetric component error is accounted for when performing best curve-fitting.

8. A wavefront absolute calibration method for separating surface accuracy errors of a reference surface and surface accuracy errors of a test surface from interferometric measurement data indicating a relative surface profile of the test surface with respect to the reference surface, the wavefront absolute calibration method comprising the steps of:

extracting a rotationally asymmetric component error of the test surface, including:
generating a rotationally symmetric wavefront having only a rotationally symmetric component of the surface accuracy errors by averaging a plurality of interferometric measurement data that are measured at a plurality of rotational positions of the test surface while the test surface is rotated about an optical axis; and
subtracting a rotationally averaged data representing the rotationally symmetric wavefront from the interferometric measurement data measured at one of the plurality of rotational positions of the test surface to extract data representing the rotationally asymmetric component error;

extracting a rotationally symmetric component error of the test surface, including:
measuring the interferometric measurement data at a laterally shifted position of the test surface that is laterally shifted from the one of the plurality of rotational positions;
subtracting one of the rotationally averaged data and the interferometric measurement data measured at the one of the plurality of rotational positions from the interferometric measurement data measured at the laterally shifted position of the test surface to derive subtracted data;
calculating lateral shift data corresponding to changes in the data representing the rotationally asymmetric component error due to the lateral shift of the test surface; and
processing the lateral shift data, the subtracted data obtained in the subtracting step, and the data representing the rotationally asymmetric component error extracted in the step of extracting to derive data representing the rotationally symmetric component error of the test surface; and
adding the rotationally symmetric component error and the rotationally asymmetric component error to derive an absolute accuracy error of the test surface, wherein corrections to toroidal variations are performed using a difference between the interferometric measurement data measured at symmetrical positions around the optical axis among the plurality of rotational positions of the test surface.

9. A wavefront absolute calibration apparatus for separating surface accuracy errors of a reference surface and surface accuracy errors of a test surface from interferometric measurement data indicating a relative surface profile of the test surface with respect to the reference surface, the wavefront absolute calibration apparatus comprising:

an interference optical system for obtaining interferometric measurement data of the test surface;
a rotation mechanism for rotating the test surface;
a lateral shift mechanism for laterally shifting the test surface; and
a computation system communicating with the interference optical system for performing the steps of:
extracting a rotationally asymmetric component error of the test surface, including:
generating a rotationally symmetric wavefront having only a rotationally symmetric component of the surface accuracy errors by averaging a plurality of interferometric measurement data that are measured through the interference optical system at a plurality of rotational positions of the test surface while the test surface is rotated by the rotation mechanism about an optical axis; and
subtracting rotationally averaged data representing the rotationally symmetric wavefront from the interferometric measurement data measured at one of the plurality of rotational positions of the test surface to extract data representing the rotationally asymmetric component error; extracting a rotationally symmetric component error of the test surface, including:
measuring the interferometric measurement data at a laterally shifted position of the test surface that is laterally shifted by the lateral shift mechanism from the one of the plurality of rotational positions;
subtracting one of the rotationally averaged data and the interferometric measurement data measured at the one of the plurality of rotational positions from the interferometric measurement data measured at the laterally shifted position of the test surface to derive subtracted data;
calculating lateral shift data corresponding to changes in the data representing the rotationally asymmetric component error due to the lateral shift of the test surface; and
processing the lateral shift data, the subtracted data obtained in the subtracting step, and the data representing the rotationally asymmetric component error extracted in the step of extracting to derive data representing the rotationally symmetric component error of the test surface; and adding the rotationally symmetric component error and the rotationally asymmetric component error to derive an absolute accuracy error of the test surface, wherein the computation system performs best curve-fitting for lateral shift data representing the rotationally symmetric component error measured at the laterally shifted position using a polynomial to extract the rotationally symmetric component error in the step of extracting the rotationally symmetric component error.

10. The method according to claim 1, wherein the step of processing includes performing a polynomial best fitting method for the date indicating the relative surface profile at the second position.

11. The interferometric measurement apparatus according to claim 2, wherein the processor performs a polynomial best fitting method for the data indicating the relative surface profile at the laterally shifted position.

* * * * *